US005760365A

United States Patent [19]
Milewski et al.

[11] Patent Number: 5,760,365
[45] Date of Patent: Jun. 2, 1998

[54] NARROW GAP LASER WELDING

[75] Inventors: John O. Milewski; Edward Sklar, both of Santa Fe, N. Mex.

[73] Assignee: The Regents of the University of Calif., Oakland, Calif.

[21] Appl. No.: 554,139

[22] Filed: Nov. 6, 1995

[51] Int. Cl.$^6$ .................................................. B23K 26/00
[52] U.S. Cl. ....................................................... 219/121.64
[58] Field of Search ........................ 219/121.83, 121.63, 219/121.64; 364/474.08

[56] References Cited

PUBLICATIONS

Belforte, David and Morris Levit, eds., "The Mechanism of Laser Cutting," p. 90; Processing Problems Associated with Laser–Induced Plasma, p. 111; What Lasers Can and Can't Do, p. 117; Absorbers, p. 154; *Industrial Laser Handbook*, Penn Well Books, 1986.

Minamida, Katsuhiro, Masashi Oikawa, Atsushi Sugihashi and Motoi Kido, "Laser Welding of Metal Honeycomb Panel with Multiple Reflecting Effects of High Power Laser Beams," proceedings of ICALEO (1992), pp. 557–564.

J. L. Murphy, "Multipass Autogenous EBW of 304L and 21–6–9 Stainless Steel," *Welding Journal Research Supplement*, Nov. 1989, pp. 33–39.

K. Minamida, H. Takafuji, N. Hamada, H. Haga and N. Mizuhashi, "Wedge shape welding with multiple reflecting effect of high power $CO_2$ laser beam," in *The Changing Frontiers of Laser Materials Processing*, eds. C. M. Banas and G. L. Whitney, Proceedings of the 5th International Congress on Applications of Lasers and Electro–optics, ICALEO '86, IFS (Publications) Ltd, UK, Nov. 1986. This publication will provide basic background information.

John O. Milewski and Ed Sklar, "Modeling and Validation of Multiple Internal Reflections for Enhanced Laser Welding," JOWOG 22d, Lawrence Livermore National Laboratory, Nov. 8–10, 1994. This conference presentation included discussion of the claimed invention.

Seymore, Kimberly, "Laser Welding Narrows the Gap," *Photonics Spectra*, May, 1995. This magazine article broadly states some aspects of the claimed invention.

Seymore, Kimberly, "Ultra–Narrow Gap Laser Welding," *Commerce Business Daily*, Jan., 1995. This newsprint article states some advantages of the invention.

L. H. Shaw and M. J. Cox, "High Aspect Ratio Nd/YAG Laser Welding," *Advances in Joining and Cutting Processes*, Conf. Proceedings, ed. K. I. Johnson, Harrogate, UK, Oct. 30—Nov. 2, 1989. Publication of conference proceedings disclosed background information for the claimed invention.

Dawes, Christopher, "Welding Sheet Metal Parts," *Laser Welding*, Abington Publishing, 1992, pp. 128–137. This chapter provides basic background information.

Dawes, Christopher, "Single and Multi–pass Welding with Filler Materials," *Laser Welding*, Abington Publishing, 1992, pp. 151–161. This chapter provides basic background information.

R. H. Phillips and E. A. Metzbower, "Laser Beam Welding of HY80 and HY100 Steels Using Hot Welding Wire Addition," *Welding Research*, Supplement to the *Welding Journal*, sponsored by American Welding Society and the Welding Research Council, Jun., 1992. This publication provides background information.

*Industrial Laser Handbook*, pp. 90, 111, 117 and 154. This publication provides background information.

J. L. Murphy, "Multipass Autogenous EBW of 304L and 21–6–9 Stainless Steel," *Welding Journal*, pp. 33–39. This publication provides background information.

(List continued on next page.)

*Primary Examiner*—Geoffrey S. Evans
*Attorney, Agent, or Firm*—Gemma Morrison Bennett

[57] ABSTRACT

A laser welding process including: (a) using optical ray tracing to make a model of a laser beam and the geometry of a joint to be welded; (b) adjusting variables in the model to choose variables for use in making a laser weld; and (c) laser welding the joint to be welded using the chosen variables.

8 Claims, 27 Drawing Sheets

OTHER PUBLICATIONS

J. L. Murphy, T. M. Mustaleski, Jr., and L. C. Watson, "Multipass, Autogenous Electron Beam Welding," *Welding Research*, Supplement to the *Welding Journal*, sponsored by American Welding Society and the Welding Research Council, Sep. 1988. This publication provides background information.

S. R. Bolin, "The Effect of F# and Beam Divergence on Quality of Holes Drilled with Pulsed ND:YAG Lasers," Conf.: Proceedings of the Materials Processing Symposium, ICALEO '82 (International Congress of Applications of Lasers and Electro–Optics), sponsored by Laser Institute of America, vol. 31 (1982), pp. 135, 137 and 139. These proceedings provide background information.

C. Y. Yeo, S. C. Tam, S. Jana, and Michael W. S. Lau, "A Technical Review of the Laser Drilling of Aerospace Materials," *Journal of Materials Processing Technology*, 42 (1994) pp. 15–49. This article provides background information.

NARROW GAP LASER WELDING

TECHNICAL FIELD

This invention relates to laser welding.

This invention was made with government support under Contract No. W-7405ENG-36 awarded by the U.S. Department of Energy. The government has certain rights in the invention.

BACKGROUND ART

There have been developed a number of methods of joining metals including arc welding, electron beam welding and laser welding.

Achieving desired weld joint penetration in a weld gap with a high depth to width aspect ratio with arc welding is difficult and often relies on joint design and use of multiple weld passes. Material can be removed from the joint to allow deposition of heat deep enough to attain the desired degree of penetration of the weld into the joint. Subsequent weld passes can be used to fill the joint until the desired joint thickness is achieved. However, the process of material removal through the use of large joint gaps and extensive back fill is inefficient and detrimental to the final properties of the weld joint due to the required large thermal input and residual stresses.

High energy density welding methods such as electron beam welding and laser welding have been used to achieve high depth to width aspect ratio welds. These methods generally utilize keyhole melting and do not require joint preparation and back fill. However, when these methods are used for higher aspect ratio welds, there are increased chances for cold shut voids, root porosity, other root defects and missed joints. Wire or powder filler material has been used for narrow gap, high depth-to-width aspect ratio laser welds. When keyhole mode welding for high depth to width aspect ratio welds is used, a cosmetic pass is often required to fill surface voids and undercuts; but a surface pass cannot remediate problems associated with below-the-surface and root defects.

In laser keyhole welding a vaporization cavity is formed and energy is transported into the work piece by multiple internal reflections within the keyhole. The goal of deep penetration laser welding is to maintain the keyhole necessary for energy delivery, penetration, coalescence and solidification while conserving the mass of the melted material. Keyhole mode melting relies on many competing thermal and physical processes which are difficult to control, particularly in the case of partial penetration welds with high aspect ratios.

For deep penetration of laser beams into metals, high average power or high peak power and beam focusing conditions are generally required to create energy densities needed for deep penetration laser welding. The lasers used have been large multi-kilowatt carbon dioxide systems. Given the inherent inefficiency of the laser welding process, achieving and maintaining a keyhole of sufficient size and stability requires large, expensive, and complex lasers. The high average power levels or high peak power levels required are expensive.

Laser and electron beam welding methods usually require extensive and precise positioning of the work pieces and generally rely on tight fitting joints with no joint gap. Other factors such as vacuum chamber size when using the electron beam method and by the hard optics required for high power carbon dioxide welding also limit the process. For these reasons and economic considerations, electron beam welding and laser welding are generally not used for welding work pieces out of position or for on-site welding out in the field.

Narrow gap joints of at least several millimeters in width have been used for successful laser welds. The narrow gap geometries have been straight walls or simple V-grooves with no attempt to optimize joint geometry or optical conditions.

Multiple-pass autogenous electron beam welding of narrow gap joints using weld joint shrinkage and side wall melting to provide joint gap fill has been used. In this method the weld face under fill is confined to a weld boss which can be removed by a post weld machining operation.

Some metals such as aluminum, beryllium and copper are highly reflective to laser energy, reflecting as much as ninety percent of the laser beam. Other metals such as niobium, tantalum and rhenium have high melting points, thus making low powered laser welding difficult. When attempts are made to join these metals, especially when a deep penetration weld is to be made, the weld is typically achieved by establishing a keyhole mode of melting. Reflected laser energy can damage laser equipment and can be inefficient.

Therefore, it is an object of this invention to provide a method for narrow gap laser welding which can be used to produce welds with high depth-to-width aspect ratios.

It is another object of this invention to provide a method of joining highly reflective metals such as aluminum, beryllium, copper and alloys thereof.

Another object of this invention is to provide a method of joining metals with high melting points, such as niobium, tantalum, rhenium and alloys thereof.

It is a further object of this invention to provide a method of laser welding which can be accomplished using lower powered lasers than previously required.

Still another object of this invention is to provide a method of laser welding which relies on conduction mode melting rather than keyhole mode welding to produce welds with high depth-to-width aspect ratios.

It is yet another object of this invention to provide a means for designing laser weld joints which take advantage of the effects of multiple reflections of the laser beam in the weld joint.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects, and in accordance with the purposes of the present invention, as embodied and broadly described herein, there has been invented a laser welding process comprising: (a) using optical ray tracing to make a model of a laser beam and the geometry of a joint to be welded; (b) adjusting at least one variable in the model to choose variables for use in making a laser weld; and (c) laser welding the joint to be welded using the chosen variables.

A computer model utilizing optical ray tracing is used to predict the reflective propagation of laser beam energy focused into the narrow gap of a metal joint for the purpose of predicting the location of melting and coalescence which form the weld. The model allows quantitative analysis of the effects of changes of joint geometry, laser design, materials and processing variables. This analysis is used to enhance process efficiency and design laser welds which display deep penetration, high depth-to-width aspect ratios, reduced occurrence of defects and enhanced melting.

The weld joint acts as an optical element which propagates and concentrates the laser energy deep within the joint to be welded. Energy coupling to highly reflective materials or materials with high melting points is enhanced by use of optical ray tracing modeling for weld joint design in the welding processes of this invention.

By use of ray tracing models it is also possible to design weld joints which use multiple passes to achieve deep penetration and high depth-to-width aspect ratios without the use of filler material. The conduction mode melting of the invention process enables the use of more varied or complicated joint designs than the keyhole mode welding processes now used permit.

BRIEF DESCRIPTION OF THE DRAWINGS

The accompanying drawings, which are incorporated in and form a part of the specification, illustrate some of the embodiments of the present invention and, together with the description, serve to explain the principles of the invention. In the drawings.

BEST MODES FOR CARRYING OUT THE INVENTION

It has been discovered that by first using optical ray tracing to model a laser beam and joint geometry of a weld to be made, improved narrow gap laser welds with high depth-to-width aspect ratios can be produced. The process of this invention allows the use of a computer model, calibration of the model through experimentation and iterative application of the model to optimize selection of variables within laser welding parameters to achieve a desired welding process goal.

The invention process relies on the consideration of a weld joint as an optical element, and parameter selection based on the laser optical characteristics and the desired weld geometry.

Weld joints with top surface gap openings of a millimeter or less can be made using this invention. Use of joint geometries having a gap this narrow reduces or eliminates the need for joint back fill.

In the practice of this invention the weld joint preparation, (i.e., finish or shaping) is partially or fully consumed during a conduction melting welding process. Portions of the weld joint not consumed during a single weld pass may either be removed by machining, filled in a conventional manner with wire or powder filler, or used to concentrate the laser beam of subsequent weld passes.

Back filling of the narrow gap may be minimized by the effects of transverse weld joint shrinkage and side wall melting, thus simplifying the process. Use of optical ray trace models in accordance with this invention facilitates this by providing accurate predictions of melting locations and values of laser energy density as a function of depth within the weld joint.

Figure 1B:
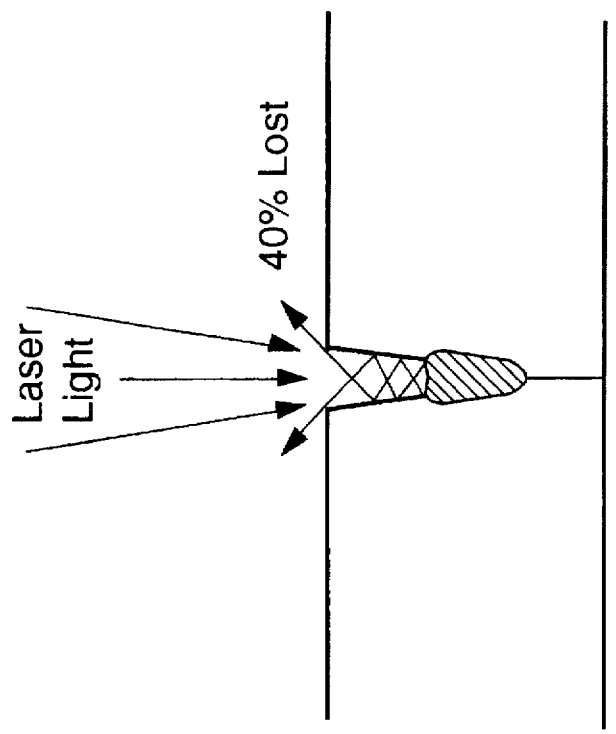
FIGS. 1A and 1B show a comparison of laser light beam reflection patterns occurring in conventional laser weld profiles with laser light beam reflection patterns occurring in the narrow gap laser weld profiles of this invention.
Figure 1A:
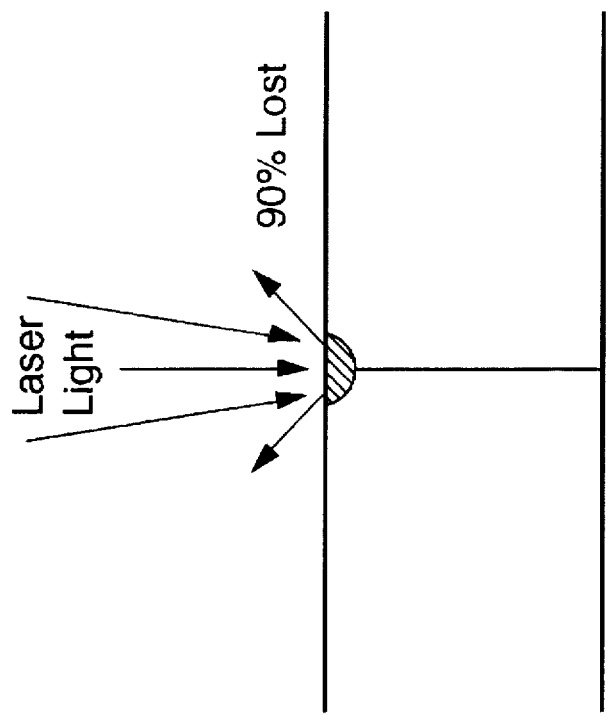

In comparison to conventional conduction mode melting where impinging laser energy has but one opportunity to be conducted into the material to be welded before being reflected away, the narrow gap weld joints of this invention provide multiple opportunities for energy coupling thus increasing process efficiency. Thus, use of narrow gap weld joints can produce deeper welds with more efficient weld geometry. FIGS. 1A and 1B show a graphic illustration of this. The conventional laser weld profile depicted in FIG. 1A shows that laser light striking the surface of a material to be welded in a conventional laser weld profile is 90% lost in reflections of laser light back out of the weld area. The narrow gap weld profile of one embodiment of this invention shown in FIG. 1B shows that laser light striking a narrow gap laser weld profile is, in this example, only 40% lost because of multiple reflections of the same beam energy deeper down into the weld gap provide for greater energy absorption.

The optical ray tracing computer model and narrow gap laser welding process of this invention enables the use of weld joints with top surface gap openings of less than 3 mm, less than 2 mm, or even as narrow as a millimeter or less. Previous state of the art allowed for use of weld joints having straight walls and V-grooves with gap openings at the top joint surface of at least 2 millimeters, and generally many millimeters.

For the practice of this invention, simple geometrical optics-based computer models can be used to describe and select key parameters such as laser focal position and joint geometry for weld schedule development. The principal of this technique relies on evaluation of a weld joint as an optical element and parameter selection based on the laser optical characteristics and the desired weld geometry. The design of the weld joint as an optical element is accomplished through joint preparation and consideration of the fact that the joint is partially or fully consumed during the welding process. Weld joint material not consumed during a single weld pass may either be removed by machining, filled in a conventional manner, or used to concentrate the beam of subsequent weld passes. Significant benefits in coupling efficiency and weld geometry are realized through practice of the present invention. Use of optical ray trace models in planning weld schedules permits use of more complex or a greater variety of weld joint geometries than would otherwise be feasible or possible.

A computer program for performing optical ray tracing is used to model the laser beam and joint geometry. A simplified ray tracing model considering the most dominant effects of one or more well understood parameters can be used, or more complex ray tracing models incorporating a large number of variable parameters can be used. For the practice of this invention, values within at least one of the following parameters are varied (used as a variable) while other variables are kept constant: laser F-number, laser beam divergence, laser beam quality, laser focal position, tilt of the laser beam axis, spatial laser energy distribution, laser wavelength, reflectivity of the surfaces to be welded, joint geometries including joint angle of the surfaces to be welded, shapes of joint of surfaces to be welded, surface condition and number of weld passes to be made. For example, use of a simplified two-dimensional ray tracing model considering the propagation of rays along a single plane transverse to the weld joint and containing the axis of the laser beam can enable welding of joints with much more narrow gaps and higher depth-to-width aspect ratios than previously possible. The single plane along which the greatest effect (energy deposition) occurs would be chosen.

More complicated ray tracing models can incorporate data representing the three-dimensional propagation of a laser beam out of the plane containing the beam axis and can consider any of a large number of variables, including but not limited to those listed hereinabove.

In the practice of this invention the joint to be welded functions as an optical system or light "guide" that directs light from a focused laser spot deep into the joint.

Straight walled weld joints tend to transport the laser beam energy to the weld root where it may produce melting but quickly turns around and "walks back out". Straight walled weld joint designs produce the least number of reflections of the laser beam within the weld joint. Laser beam propagation in straight walled or near straight walled joint designs occurs at "fixed" angles and does not display the concentration effect that can be achieved by use of the invention models to develop a weld schedule having the laser beam strike a near straight wall at an angle or strike a weld joint having a different geometry, such as a V-groove with a selected included angle.

Figure 2A:
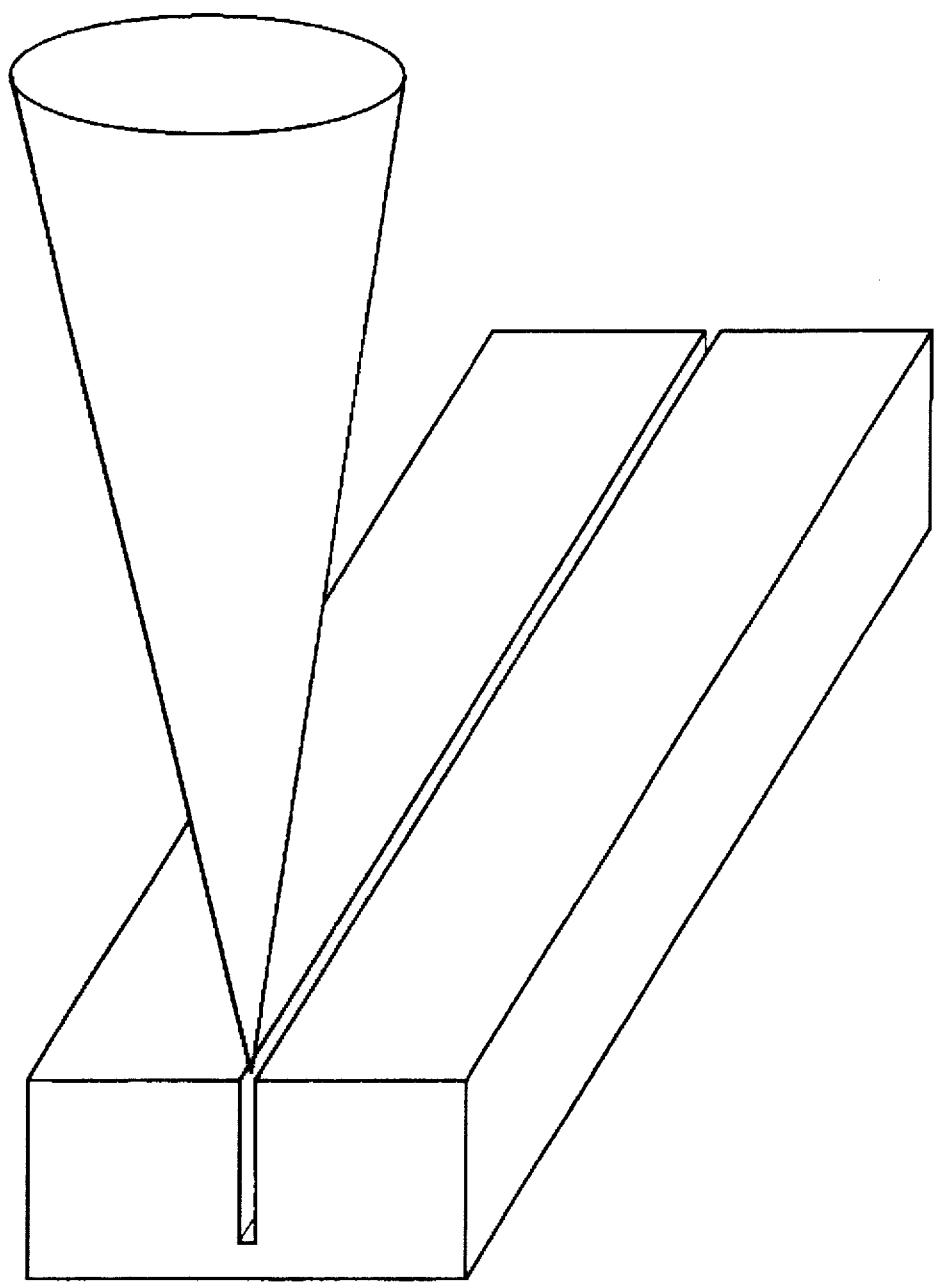
FIG. 2A is an illustration of a straight wall weld joint with a fixed width gap.
Figure 2B:
FIG. 2B illustrates a ray trace showing the fixed angle propagation of a laser beam into a fixed width gap.
Figure 2C:
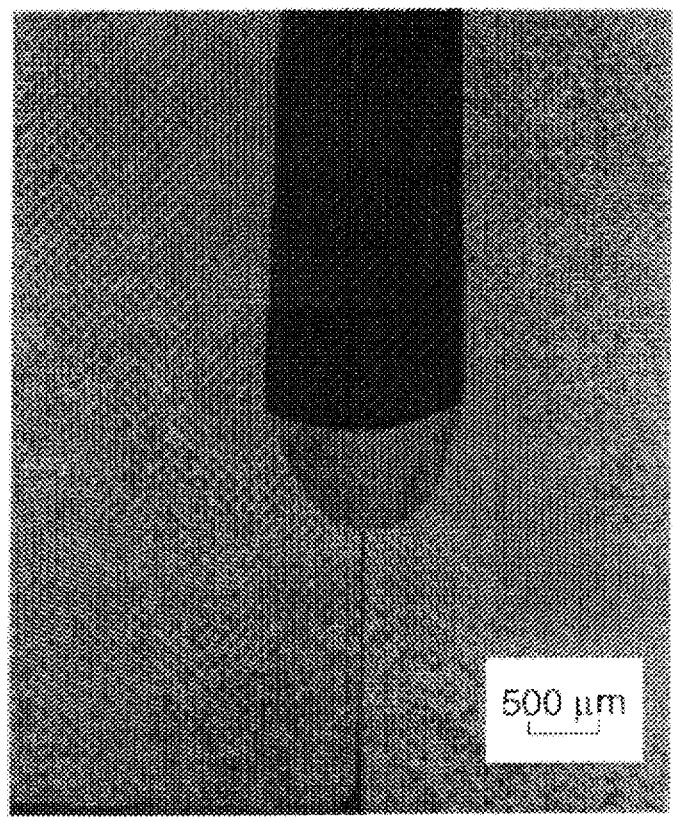
FIG. 2C shows a magnified metallographic transverse section of a weld not made in accordance with the present invention.

FIG. 2A shows a rendering of a straight wall joint. FIG. 2B shows a ray trace showing the fixed angle propagation of a laser beam. FIG. 2C shows a magnified metallographic transverse section displaying melting only at the turn around point of a laser beam's propagation, as would occur in conventional laser welding processes.

V-groove joints propagate laser beams by reflections which increase in incident angle (more normal to the surface) and increase in frequency (decrease in wall spacing) as a function of distance into the weld joint. The implications of this are an increase in coupled energy as a function of depth of the weld joint. The joint angle and depth of the weld joint are parameters which contribute to the energy deposited as a function of depth. The variables within these parameters may be changed to achieve variation in energy deposition and the resultant weld. Choice of the optimal variables within these parameters, considering other variables within other process parameters to be used, is enabled by use of the ray tracing models.

Practical considerations such as available lens optics, laser power, spot size and the desire to reduce the volume of the weld joint to be filled will closely dictate the selection of these parameters and values within the parameters. As a result, the degree to which these parameters may be varied will have limitations based on available processing equipment.

The ray tracing code used for modeling in most embodiments of this invention performs non-sequential (unconstrained) ray tracing in which rays may hit the surfaces of the joint in any order. For purposes of the model, the joint walls are represented as surfaces that reflect a portion of the light, thus modeling an absorption whose co-efficient is independent of the incident angle of the laser light (laser energy) striking the surfaces of the joint. For example, the surface of stainless steel may reflect 60% of the laser light which strikes the surface of the stainless steel and aluminum may reflect as much as 90% of the laser light which strikes the surface of the aluminum.

Figure 3:
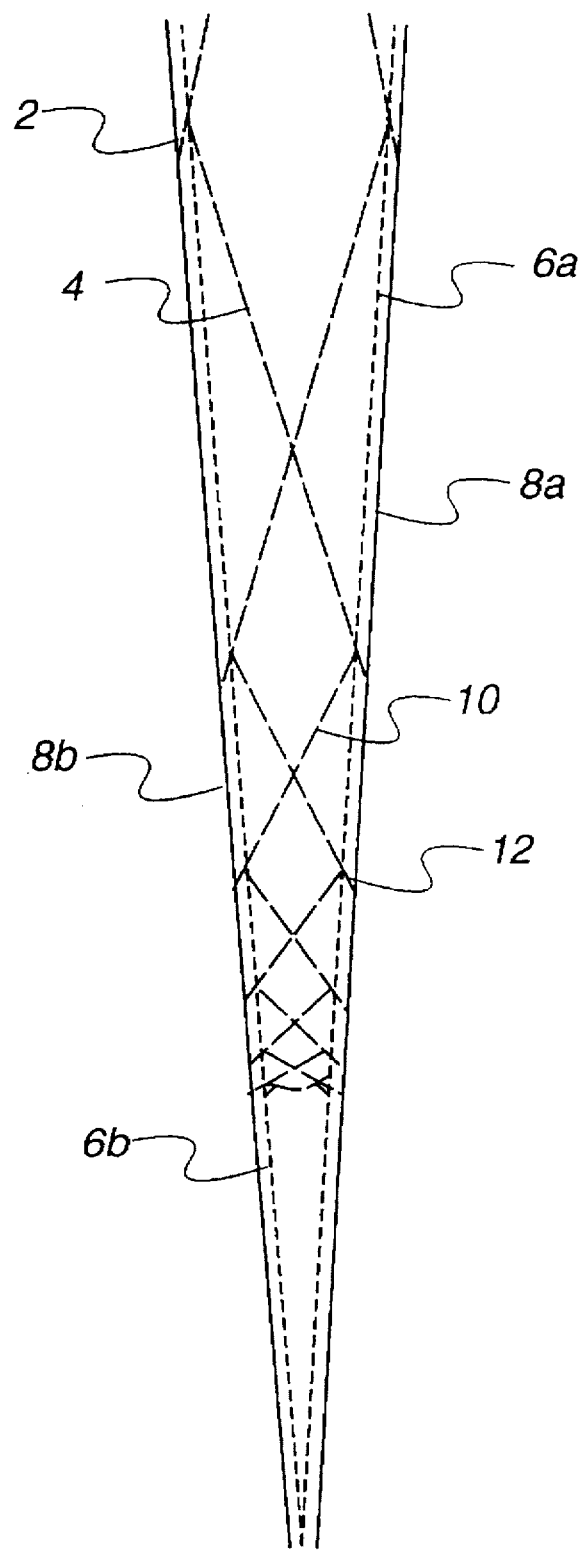
FIG. 3 shows the orientation of the reflective and absorptive planes used in the model.
Figure 4A:
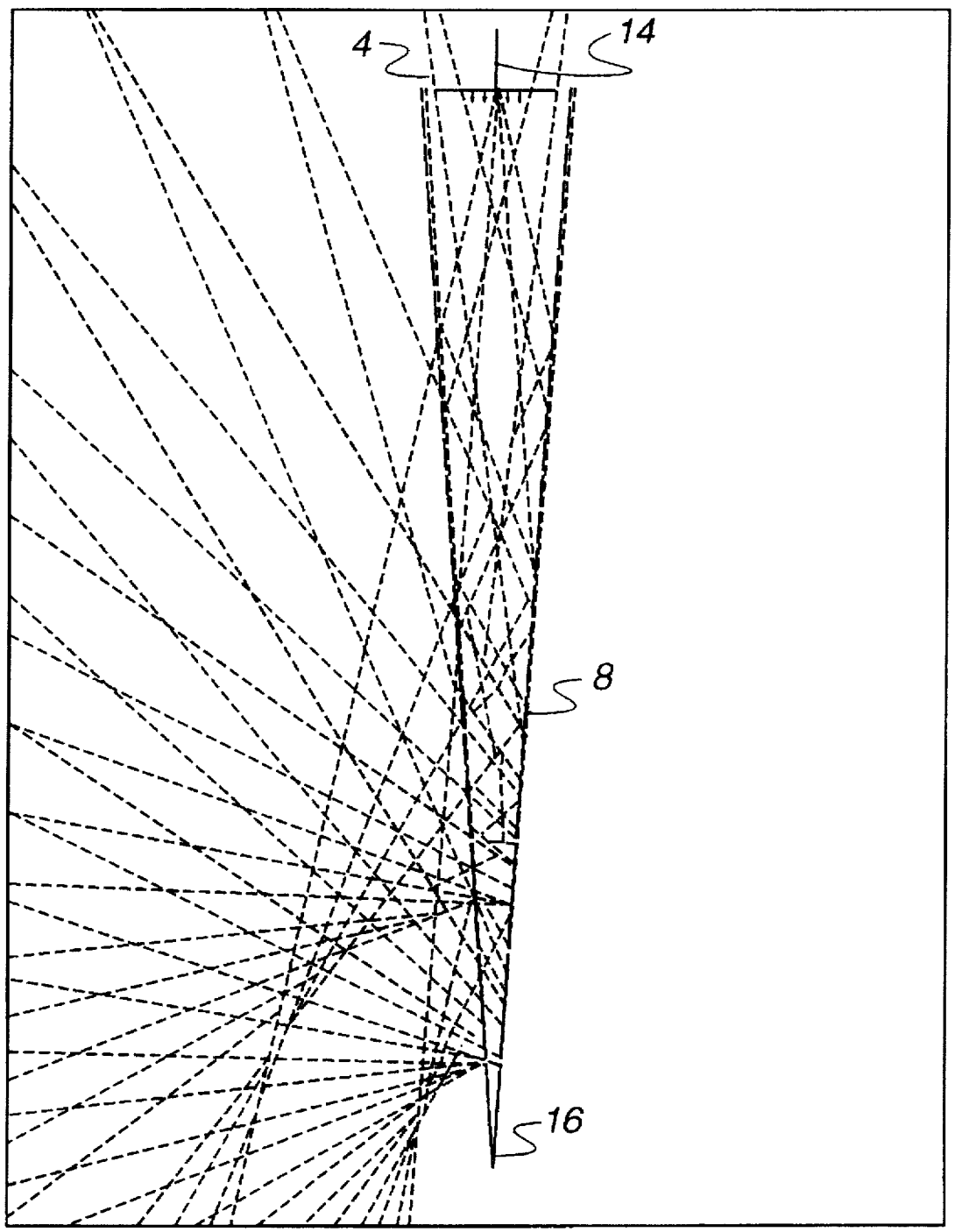
FIG. 4A is an illustration of an optical ray tracing model showing rays from one of five point sources entering a V-groove weld joint gap having a joint half angle of approximately 4° and striking a reflective surface.
Figure 4B:
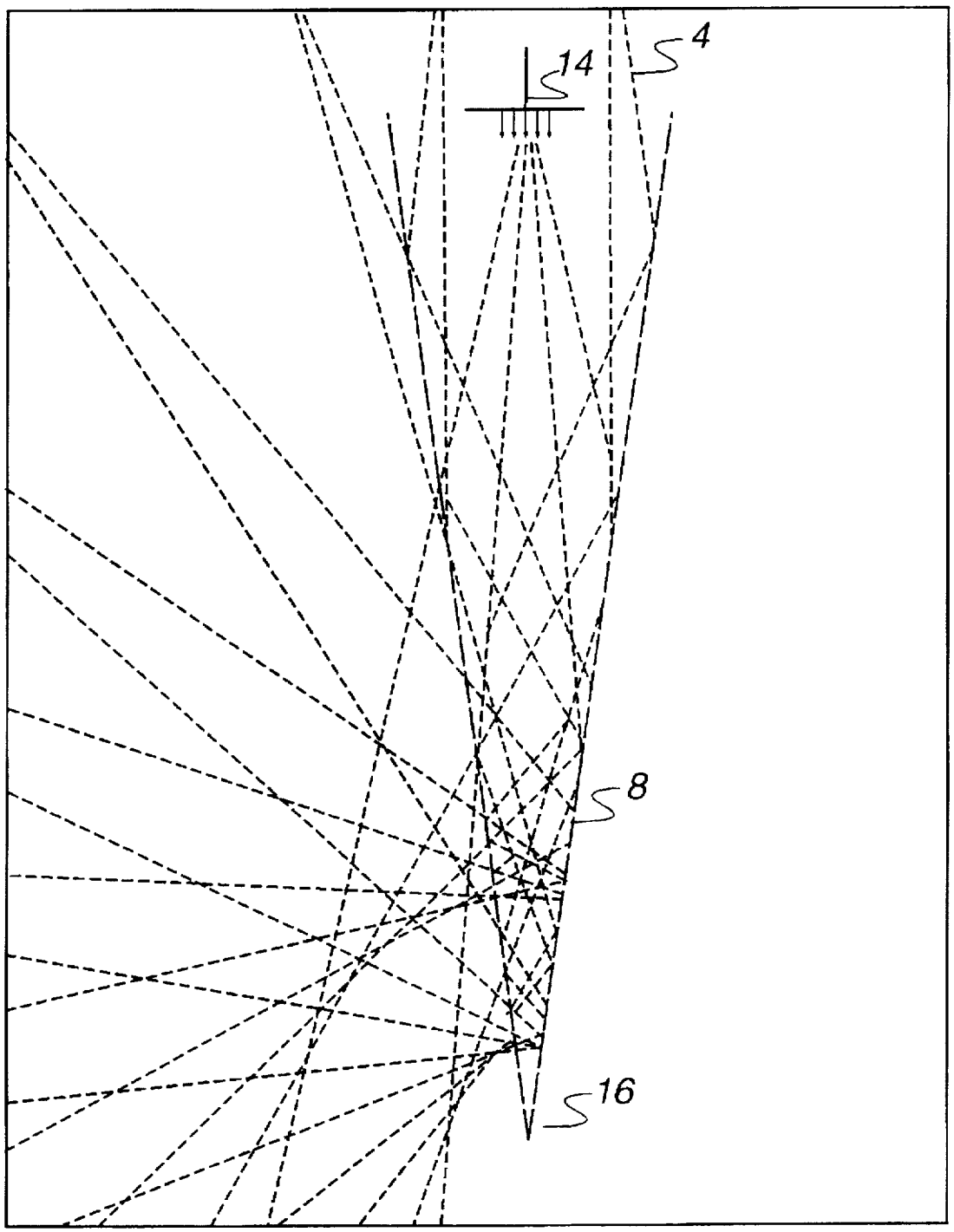
FIG. 4B is an illustration of an optical ray tracing model showing rays from one of five point sources entering a V-groove weld joint gap having a joint half angle of approximately 8° and striking a reflective surface.

For purposes of the model, the partially reflective surface of the metal is represented as having just underneath it a 100% absorbing detector plane. Examples of such an absorbing detector plane are shown in FIG. 3. With reference to FIG. 3, the short solid line 12 is representative of an absorbed ray. The dashed line 4 is representative of a reflected ray. The light dashed lines 6A and 6B represent the reflective side wall of the welding joint. Still with reference to FIG. 3, the dashed line 10 represents a reflected ray. The solid lines 8A and 8B represent the absorbing detector plane of the welding joint. The short solid line 12 represents an absorbed ray. In FIGS. 4A and 4B the laser beam cross section at the focal point is represented in the plane of interest as an arrangement of point sources. FIG. 4A shows rays from one of five point sources 14 entering a V-groove weld joint gap having a joint half angle 16 of approximately 4°. The rays are shown striking the reflective surface of the joint, being reflected onto another surface location where a portion of the energy of the rays is absorbed by the detector plane and 8 another portion of the energy of the rays is reflected once again. For purposes of illustration, the detector plane on the left wall of the joints shown in FIGS. 4A and 4B is not shown so that the direction of the incident rays can be illustrated.

Likewise, FIG. 4B illustrates rays from one of five point sources entering 14 a V-groove weld joint gap having a joint half angle of 16 approximately 8°. The portions of the propagated rays which 4 "walk back out" of the weld joint is shown in both FIGS. 4A and 4B.

Collection of energy in the detector plane can be used to gather statistics of energy deposited as a function of joint depth. Energy absorbed in the detector plane is analogous to the energy which is absorbed by the walls in the actual weld joint prior to melting.

Figure 5A:
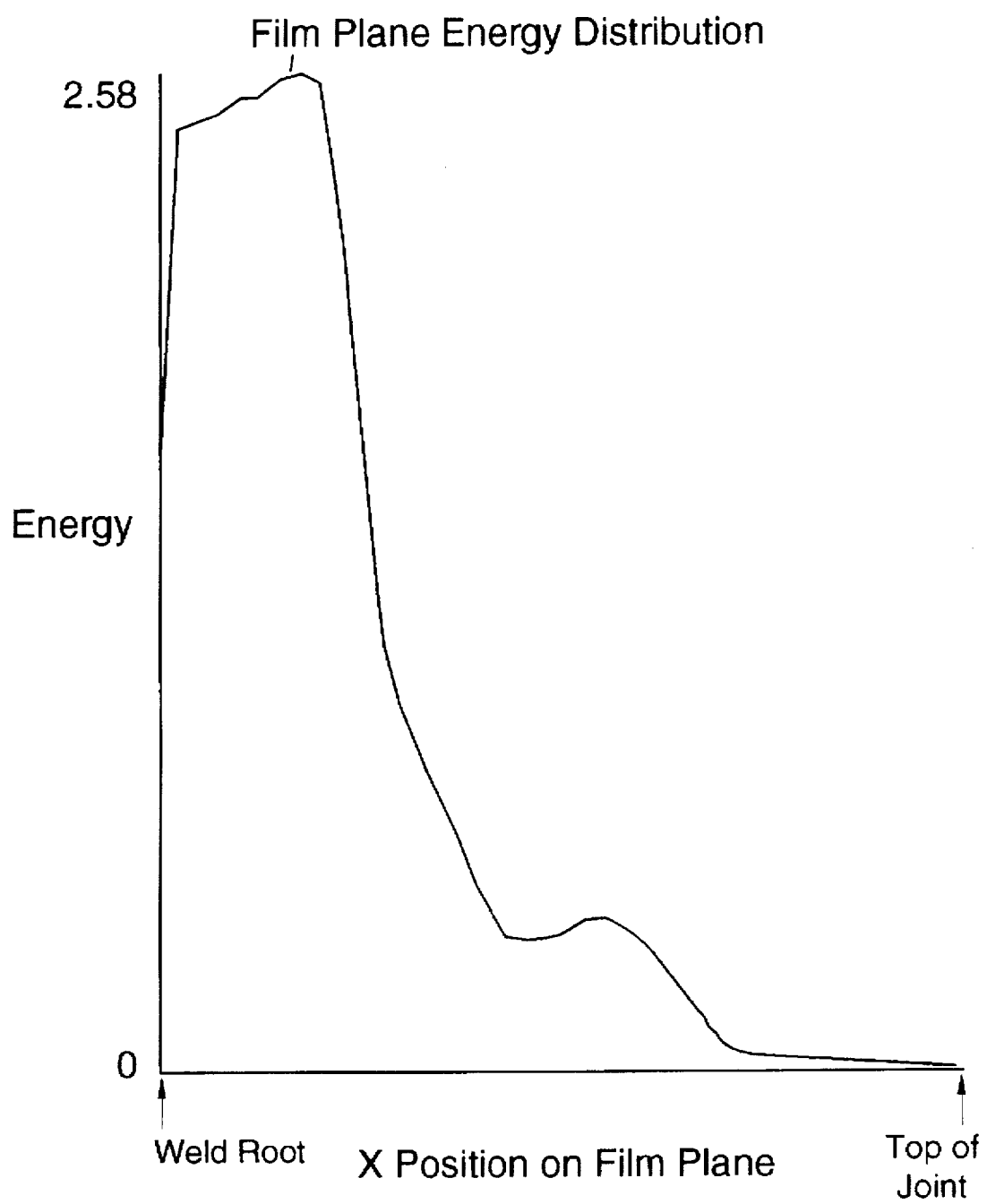
FIG. 5A is relative energy plotted as a function of the depth of the weld modeled in FIG. 4B.
Figure 5B:
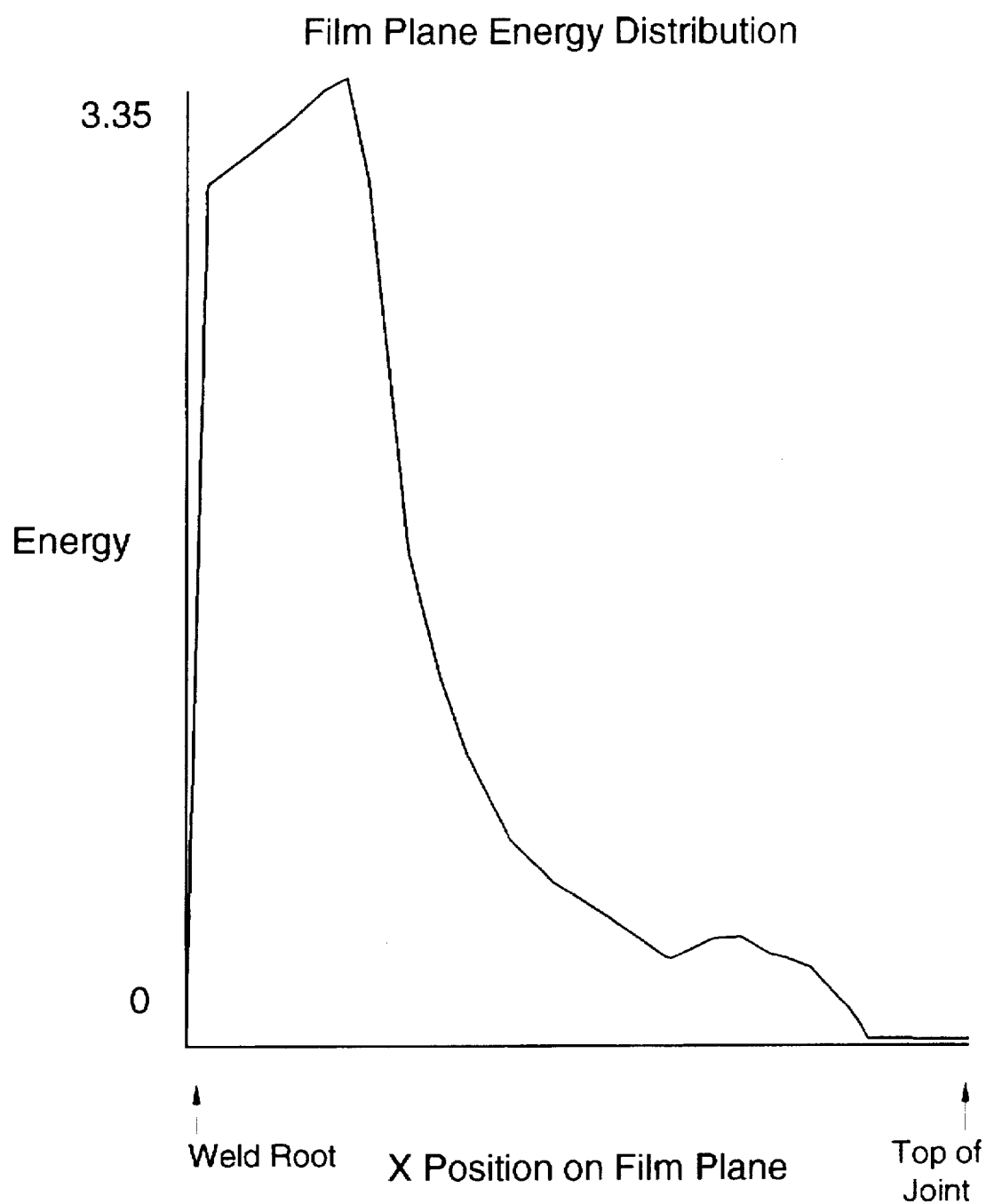
FIG. 5B is relative energy plotted as a function of the depth of the weld modeled in FIG. 4A.

From FIGS. 4A and 4B it can be seen that the direction of the rays changes as a function of depth of the joint and angle of the joint walls until the rays turn around and propagate back out of the joint. The balance of the energy is reflected at the incident angle of the ray. The relative energy plotted as a function of depth for the two simulations of FIG. 4A and FIG. 4B is given in FIGS. 5A and 5B. FIG. 5A shows the film plane energy distribution for rays in the approximately 8° joint angle and FIG. 5B shows the film plane energy distribution for rays in the approximately 4° joint angle corresponding to the reflection pattern shown in FIG. 4A. In this case of the 4° and 8° joint angles, a high relative peak is seen for a smaller joint angle.

It is believed that some significant improvement of the laser welds can be obtained by use of a model using only specular reflections without considering second order effects such as melting, heat flow, angle and temperature dependent reflectivity, and surface scattering.

In one embodiment of the invention, a ray tracing model for a narrow gap laser weld is made in the following manner.

First, a focused laser spot is represented as a summation of point sources of light, or as a summation of collimated bundles of light, or as a combination of both. From each point a number of rays (e.g., 1,000) emanates in a distribution over an angle representative of the laser beam divergence.

The three-dimensional shapes of the surfaces to be welded are described as a closed form mathematical expression such as a conic section (combinations of terms in x, y, and z ranging in power from 0 to 2) or a closed form mathematical expression having arbitrary higher power terms.

Segmented approximations of the closed form mathematical expressions also can be used. Examples of these include entities represented as three-dimensional National Institute of Standards Technology CAD standards such as IGES or other standard CAD representations.

The location and orientation of all components of the focused laser spot and the closed form mathematical expression of the geometry of the surfaces to be joined are represented in a common space frame, such as, for example, on a global coordinate system.

The reflectivity and absorption of all of the surface areas to be joined are described in the optical ray trace models as two-layered surfaces consisting of a partially reflective surface and a fully absorptive surface. Reflectivity and absorption values are assigned to all of the surfaces to be joined.

The locations of energy deposition are defined by ray trace reflections. The ray trace model is used to record the energy deposition locations.

Unit energy levels are then assigned to rays from the points defining the laser spot.

The paths of the rays are traced until each ray strikes a surface of the weld joint.

An optical ray trace is performed to obtain quantification of the energy absorbed by each location on the surfaces of the joint to be welded.

The angles of reflections are calculated.

Deposited energy at reflection point and location on detector plane is recorded.

The energy in each reflected ray is decreased by an absorption co-efficient.

The previous two steps are reiterated for each ray until substantially all energy has either been deposited in the material being welded or has walked back out of the joint. Then progation of the ray is terminated.

The process is repeated for all rays in the system.

Relative energy is plotted as a function of location on the absorption plane corresponding to locations within the weld joint.

This plot is then analyzed to obtain statistics with respect to peak energy deposition, peak width, energy distribution and intensity in weld joint.

New values or ranges of values for each of the variables are selected and the model is run again.

The results of ray traces from each of the point sources are summed to approximate the effects of extended sources, finite laser spot sizes, imperfect lasers, or imperfect optics. Then the model can be reworked to model different sets of variables.

The reworked model can then be used to determine the desired choice of at least one of: laser F-number, laser beam divergence, laser beam quality, laser focal position, tilt of the laser beam axis, spatial laser energy distribution, laser wavelength, reflectivity of surfaces to be welded, joint geometries including joint angle of surfaces to be welded, shapes of joint of surfaces to be welded, surface condition, and number of weld passes to be made.

In this embodiment, the optical ray trace of the surface representations follows the laws of reflection and refraction (e.g., Snell's Law). The optical ray trace of the surface representations is non-sequential because rays are unconstrained and do not have a preferred order in which they will intercept the surfaces. The optical ray trace of the surface representations is able to intercept the same surface multiple times.

The numerical data structure of each ray carries with it the energy it has relative to the assigned unit energy level. The relative energy is modified at every ray-surface intersection according to the reflectivity and absorption of the surfaces to be welded.

The results of the ray traces from each of the point sources are added to approximate the effects of extended sources, finite laser spot sizes, imperfect lasers, or imperfect optics.

The energy absorbed by the surfaces to be welded is displayed as energy density (energy per area).

The threshold absorbed energy density at which melting occurs is determined by comparison of the weld penetration observed using metallographic cross sections and the corresponding location within the simulation plot of relative energy versus depth within the joint.

Commercially available computer programs designed for use in optical industry applications can be used for some steps of the modeling. For example, OptiCAD® computer assisted optical design programs can be used for ray tracing both segmented approximations and closed form mathematical expressions. These commercial programs can be modified for use in the practice of this invention by the addition of user defined functions such as an angle dependent coupling function for the purpose of extending the utility of the program. Output file formats can be defined to extend the compatibility of the output files to other analyses and presentation software packages.

Once the model has been made, the size, shape and position of the weld which would result from use of the variables chosen for the model can readily be ascertained. Then, on a trial-and-error basis, variables can be selected and altered in the model until it is shown that the optimal possible size, shape and position weld would result.

Models can be made for multiple-pass welding processes. Modeling of multiple-pass conditions essentially iterates the initial model conditions for an assumed joint geometry resultant from previous weld passes. Accurate prediction of the evolution of the narrow gap as a result of successive passes is made more complex by changes in the gap geometry as a result of transverse shrinkage, side wall melting and top bead contour of previous passes. Information obtained from experimentation and modeling of heat and fluid flow can be used to improve the geometric definition of the evolving optical surfaces.

The model variables to be altered can be selected on the basis of economic need, equipment availability, ease with which adjustment can be made, as well as on the basis of which alterations in which variables produce the most change for the least alteration or which produce the optimum desired results. The model variables can be systematically altered, one or more at a time, in accordance with the degrees of freedom within each parameter, until a modeling result which will specify the best weld available under the circumstances is obtained.

The narrow gap welds which can be made using the present invention have many advantages. Deep gaps less than 2 mm wide can be welded using the process of this invention; even gaps less than 1 mm wide can be joined with high aspect ratio welds using the process of this invention. In the narrow gap welding processes of this invention, shrinkage of the molten material can be used to help close the gap, thereby minimizing the need for or making unnecessary subsequent passes or fillers. With the narrow gap welding processes of this invention, only a relatively small amount of the side walls of the weld have to be melted to close the gap. This conserves energy and enables laser welding with lower powered lasers (e.g., lasers of 4 kW or less), including YAG lasers, which can be delivered with fiber optics and are therefore compatible with robotics. Narrow gap welding allows for multiple passes without need for filler material because shrinkage closing of the gap and sidewall melting can in many cases provide sufficient fill to achieve the desired weld penetration depth. With the narrow gap welds of this invention, there generally will be no overbead which has to be removed in post welding finishing or machining operations.

The methods of this invention can be used to join highly reflective metals such as aluminum, beryllium and copper or high melting temperature metals such as niobium, tantalum and rhenium by improvement in energy coupling efficiency.

High aspect ratio welds allow for deeper penetration for the same volume of material to be melted than welds with lower aspect ratios. Such high aspect ratio welds made in accordance with this invention take advantage of the effects of multiple reflections of the laser beam in the weld joint. The deeper penetration results in a stronger weld and reduces the number of passes which have to be made. Also, with higher aspect ratio welds, there is less shrinkage transverse to the weld joint of the molten material because the transverse dimension of the weld profile is minimized. The energy concentration effect can allow welds to be made at powers which would not produce sufficient melting for welding when using conventional joint designs. The methods of this invention enable narrow gap laser welding by conduction mode melting processes rather than keyhole mode welding, thusly avoiding the necessity for the vaporization required to form the keyhole and the problems associated with keyhole mode welding.

The following examples will demonstrate the operability of the invention.

EXAMPLE I

A ray tracing model was made using data for absorption and wavelength as a function of the material to be welded, laser beam F-number, and position of the beam focal point as variables. Values of these parameters were changed in the model to determine the effects of the variables on the system. Energy absorbed as a function of depth within the weld joint was plotted. The effect of side to side and angular orientation changes of the point sources was modeled. The effect of the joint being filled and shaped by fill passes was modeled for multiple-pass welds.

Constant beam coupling of 40% energy per reflection (irrespective of incident angle) was assumed in this model because of the reflective properties of the metal (304 stainless steel) chosen for the runs of this example. Ray propagation was cut off in the model when the ray was calculated to have 1% of the original energy of the ray.

The model was also used to compare higher quality laser beams with F-numbers of 8 and a smaller spot size.

Using a ray trace model, the following simulations were performed on a 486 PC: the effect of a straight joint with parallel walls; included joint angles of 8 and 12 degrees with varying depths; and multiple passes with joint fill provided by shrinkage and side wall melting. Data from the simulations was plotted.

Data regarding the optical train, joint geometry and material type were used as input to the computer model to simulate these conditions.

The model showed that for the joint geometry modeled in stainless steel some energy did propagate all the way into the joint root and part of the way back out. The model was used to evaluate the effect of changes to the included angle and depth of the weld joint.

Then actual laser welds were performed according to the chosen model simulations to determine the accuracy of the models by comparison of the profiles of the actual weld cross sections and melted joint surfaces with the computer simulations.

A fiber optically delivered Nd:YAG industrial laser welder was used to focus a 2 kW continuous wave beam into 1 mm weld joint gaps in 5 samples of 304 stainless steel. The joint gaps were of two basic designs, 1 sample with straight parallel sides and 4 samples with narrow V-grooves. V-groove weld joint angles were varied in the model. Two runs were single pass welds: one made in an 8° V-grooved sample and one in a 12° V-grooved sample. Two runs were double pass welds: one made in an 8° V-grooved sample and one in a 12° V-grooved sample. The weld processing conditions used for each of the weld passes are given in Table 1. All the samples of the runs of this example had 1 mm gaps. The beam focal position was even with the joint surface.

TABLE 1

Weld Processing Conditions
Used For a Narrow Gap Weld of Stainless Steel

| Parameter | Chosen Variable |
| --- | --- |
| Laser | 2 kW Nd:YAG |
| Wavelength | 1.06 μm |
| Travel speed | 110 cm/min |
| Laser head tilt angle | 10° |
| Shield gas | Argon |
| Joint type | Ultra-narrow V-joint |
| Joint width as surface | 1.0 mm |
| Joint included angle | 12° sample 1, 8° sample 2 |

Initial weld passes were made along the entire length of each of the 4" samples. Subsequent weld passes were staggered with respect to the starting point of each of the previous weld passes. This weld schedule allowed metallographic cross sections to be made in two places to track the sequence of the first two passes used to weld the joint.

The straight wall weld joint runs indicated little melting due to a failure of the joint geometry to concentrate sufficient energy to attain the melting threshold for the wall area impinged upon by the laser beam. FIG. 2C shows the melting in a straight joint compared with that in narrow V-groove joints, as shown in FIGS. 6 and 7.

The narrow gap V-groove welds of this example demonstrated that energy sufficient to melt the stainless steel material could be transported and focused into a weld joint at significant depths. In comparison, a weld attempted at an out-of-focus condition equal to the V-groove joint depth would not achieve sufficient energy density to produce melting.

Figure 6A:
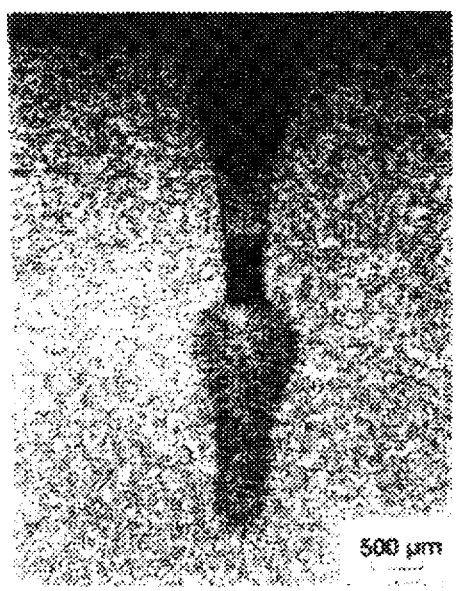
FIG. 6A is a transverse optical micrograph of the first pass of a laser weld in a V-groove with a 12° included angle made in accordance with the invention.
Figure 6B:
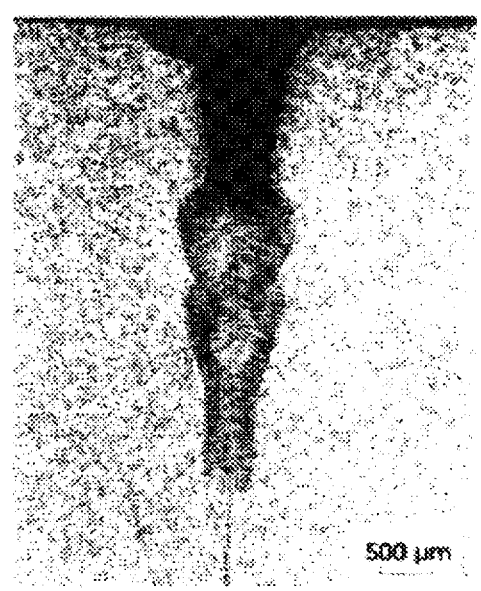
FIG. 6B is a transverse optical micrograph of the second pass of a laser weld in a V-groove with a 12° included angle made in accordance with the invention.
Figure 7A:
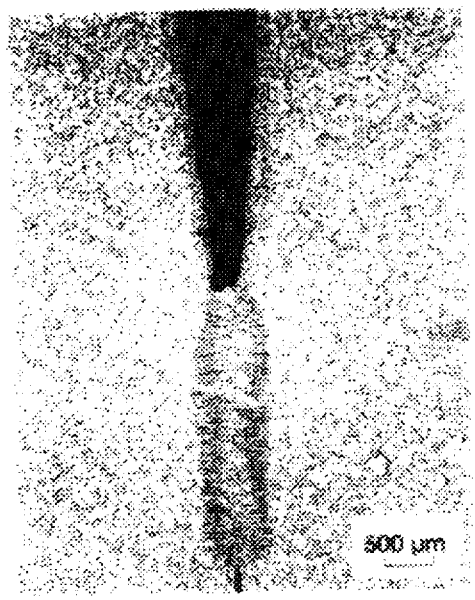
FIG. 7A is a transverse optical micrograph of the first pass of a laser weld in a V-groove with a 8° included angle made in accordance with the invention.
Figure 7B:
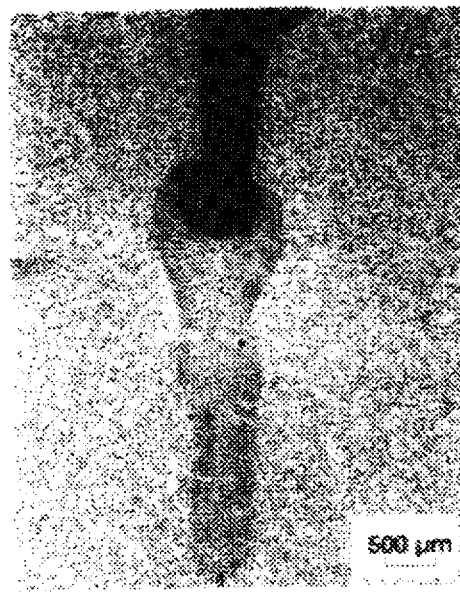
FIG. 7B is a transverse optical micrograph of the second pass of a laser weld in a V-groove with a 8° included angle made in accordance with the invention.

Changes in included angle in the V-groove welding samples produced changes in joint depth; the narrower angles were deeper. FIGS. 6A, 6B, show the first and second weld passes for, respectively, a joint having a 12° included angle; FIGS. 7A and 7B show the first and second passes for, respectively, a joint having an 8° included angle.

The narrower joint displayed a deeper, more narrow weld while the wider angle joint weld displayed more of a "nail head" cross section. Initial weld passes produced transverse shrinkage and closing of the weld joint which had the effect of narrowing the gaps another 1 to 2 degrees.

Figure 8:
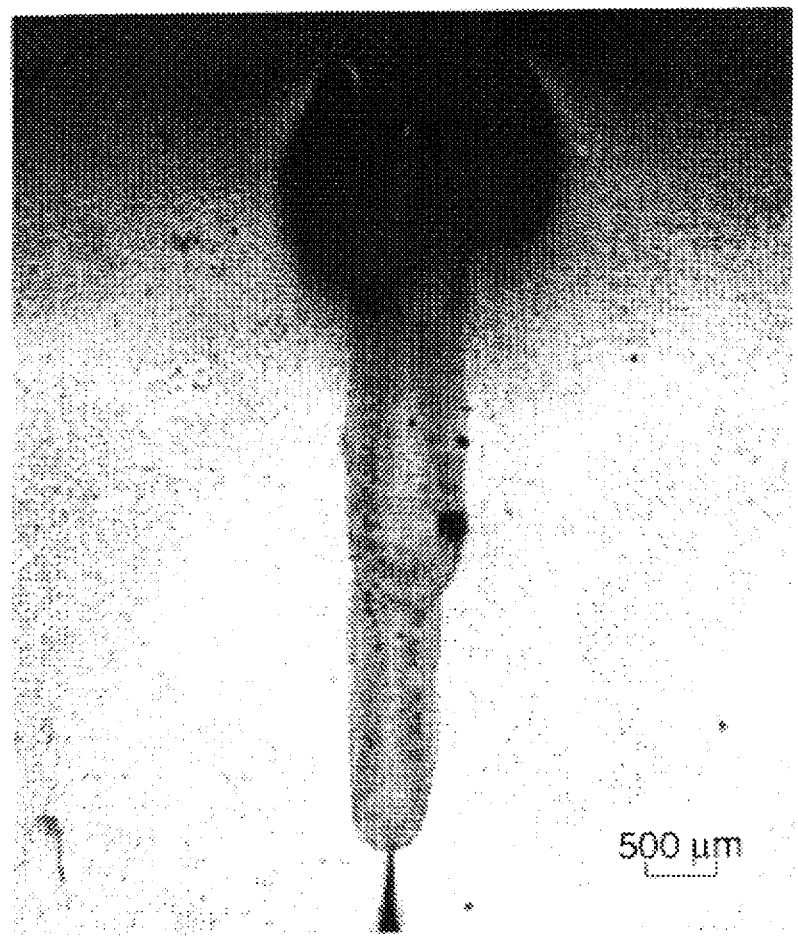
FIG. 8 is a narrow gap weld in accordance with the invention which relied on shrinkage to close the joint.

Optical inspection of weld bead surface and metallographic sections of the welds showed no evidence of voids or cracking. Fusion was complete at the roots of the weld joints. Transverse shrinkage and side wall melting allowed a three-pass weld with a depth of 3 mm and a depth to width aspect ratio of 5:1 to be produced. This is shown in FIG. 8.

Comparisons of the profiles of the actual weld cross sections and melted joint surfaces with the computer simulations showed good agreement between the location of the weld and the energy concentration peak.

EXAMPLE II

A comparison was made between a ray tracing model for conditions of an aluminum weld joint and the actual melted surfaces of the weld made under the same conditions as were used in the model.

Figure 9A:
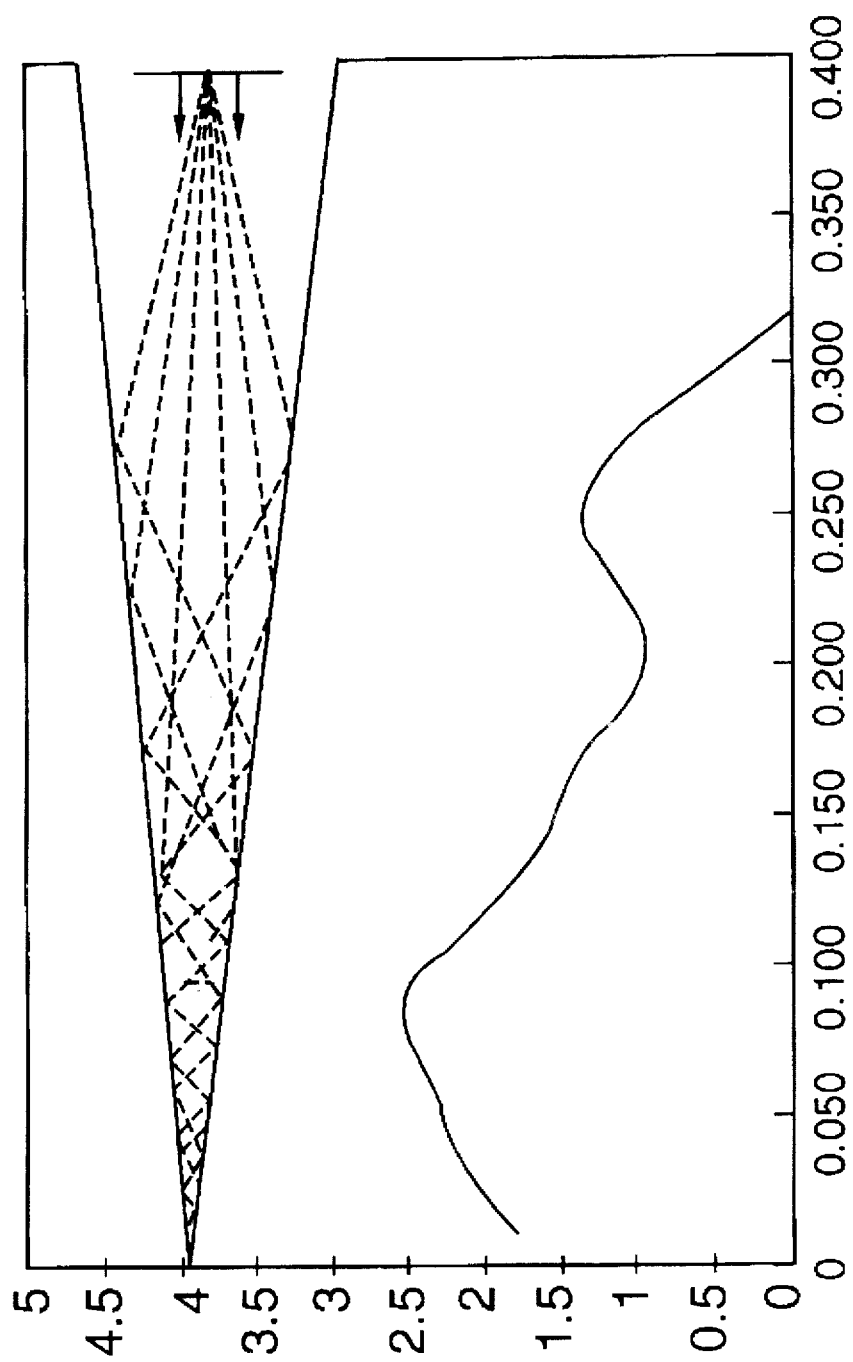
FIG. 9A shows the correlation between the effects of a focus depth of 0.00" and location of relative energy densities in a V-groove weld joint.
Figure 9B:
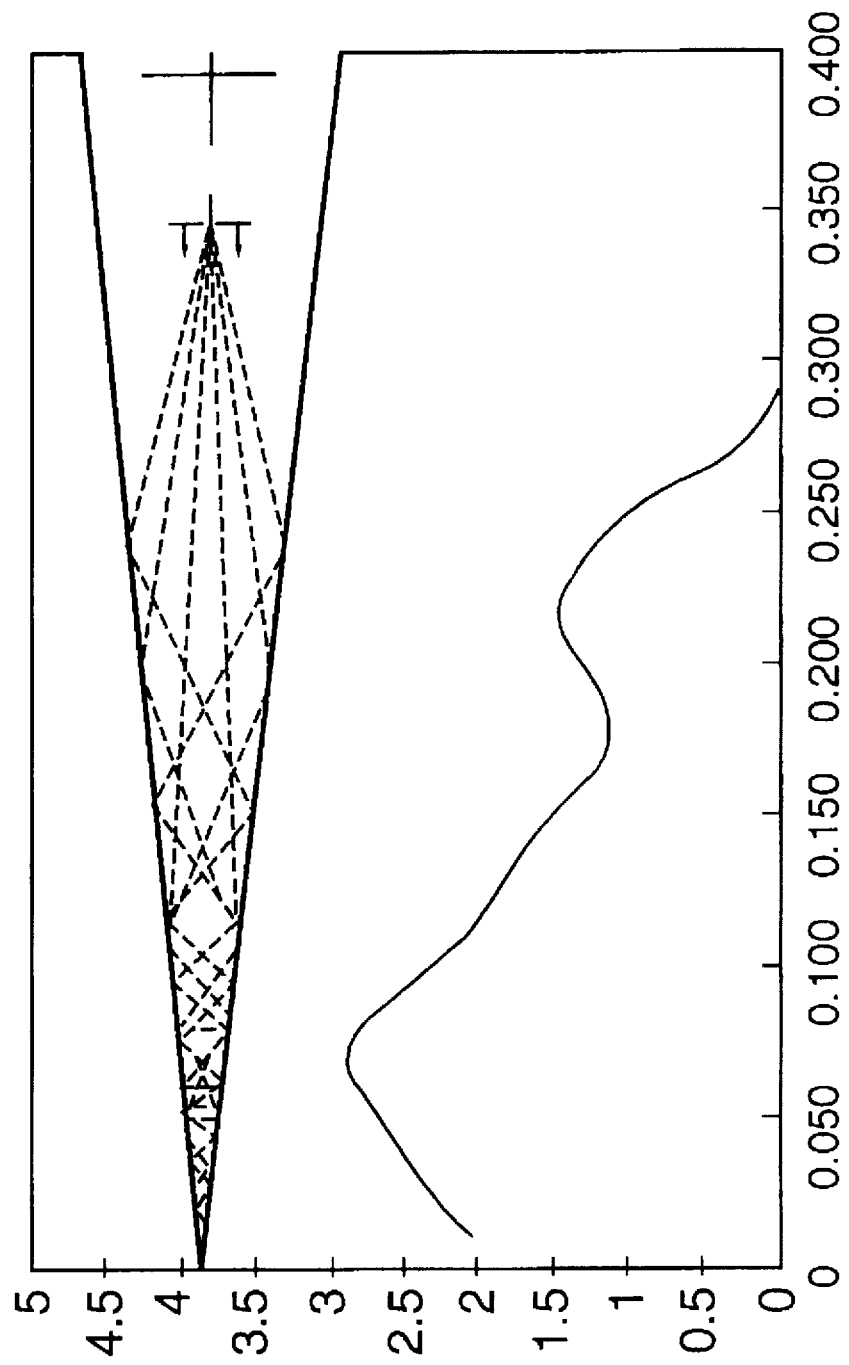
FIG. 9B shows the correlation between the effects of a focus depth of 0.05" and location of relative energy densities in a V-groove weld joint.
Figure 9C:
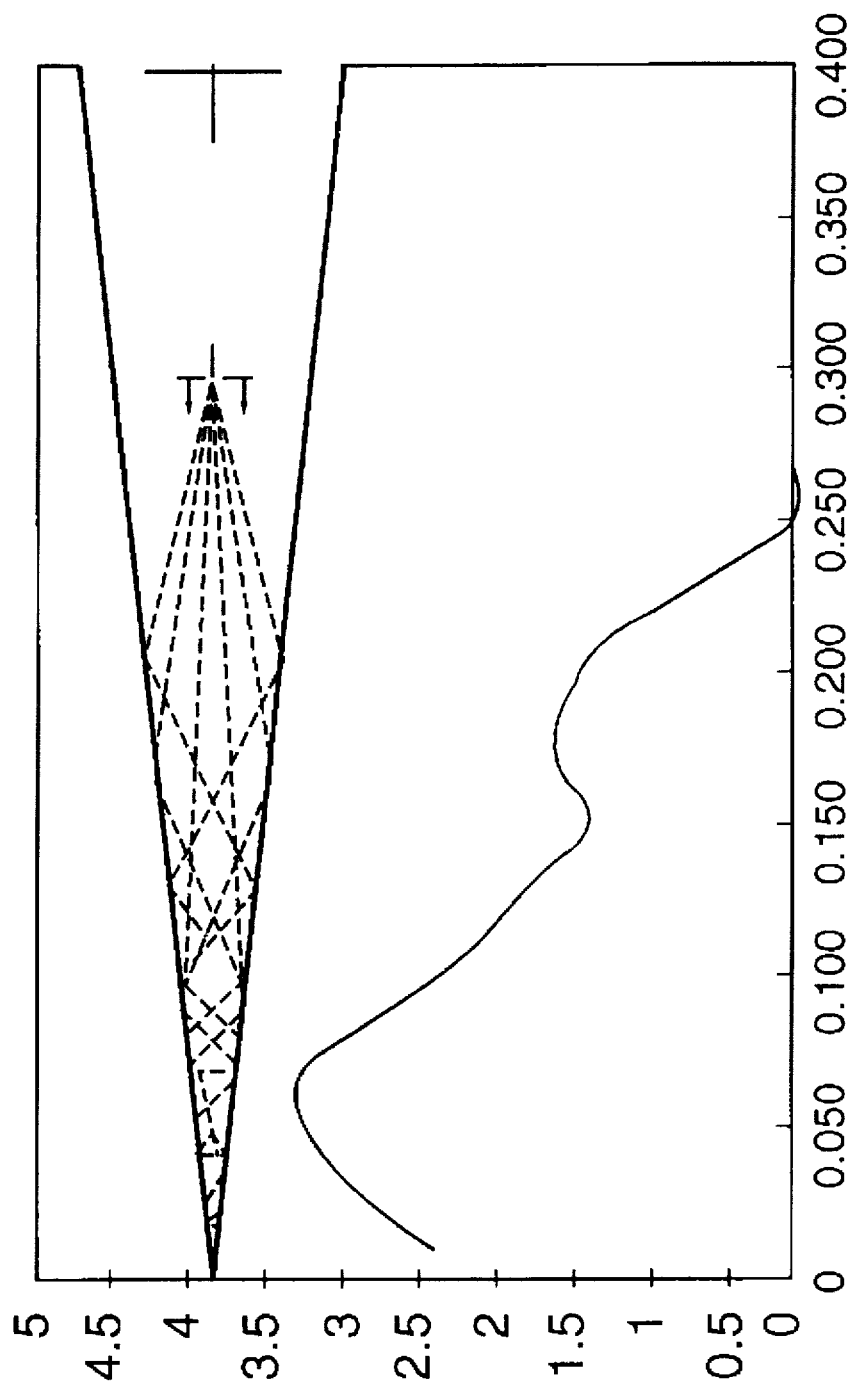
FIG. 9C shows the correlation between the effects of a focus depth of 0.10" and location of relative energy densities in a V-groove weld joint.

The changes in focal position shown in Table 3 were modeled for the V-groove weld joint geometry shown in FIGS. 9A, 9B and 9C. In these simulations the focal spot size was smaller than the joint gap at the surface having focus depths of 0.00", 0.05" and 0.10", respectively. This allowed focal position changes while still assuring the entire laser beam would propagate into the weld joint and not be clipped by impingement upon the top edges of the weld joint.

Figure 10C:
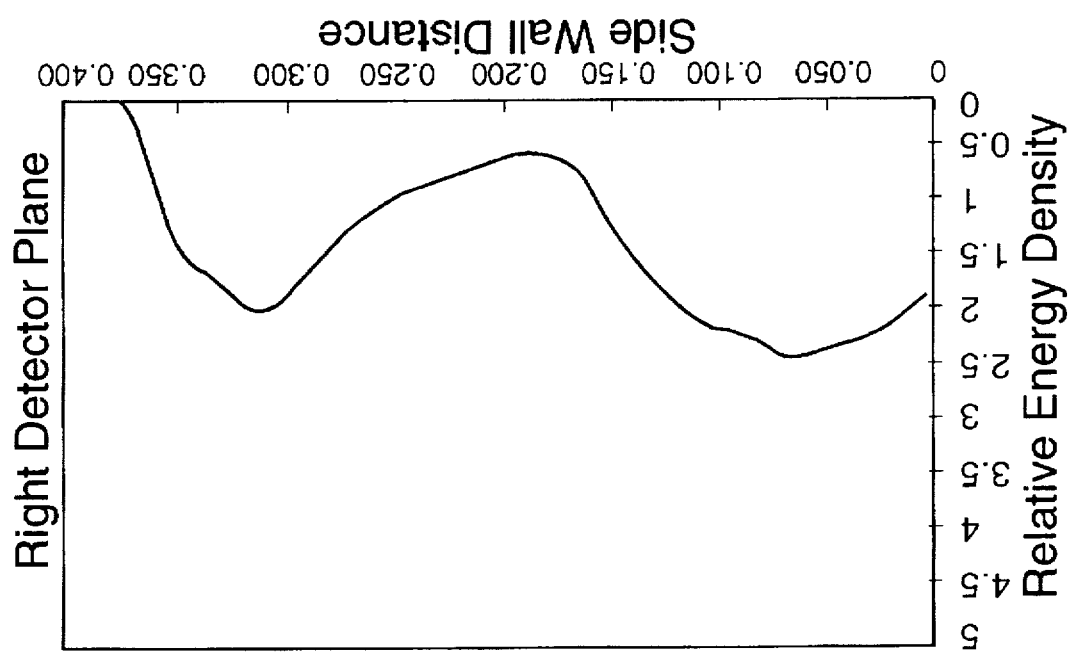
FIGS. 10A, 10B and 10C show correlations between location of offset laser focal point location and locations of relative energy densities in a V-groove weld joint.
Figure 10B:
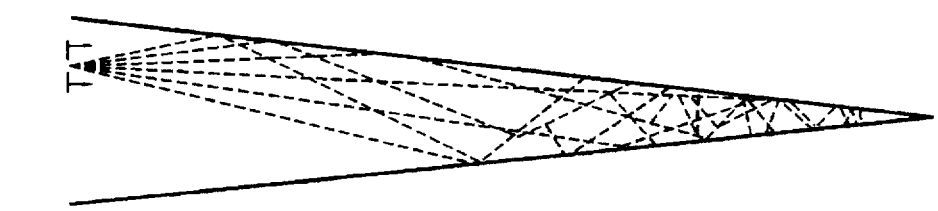
Figure 10A:
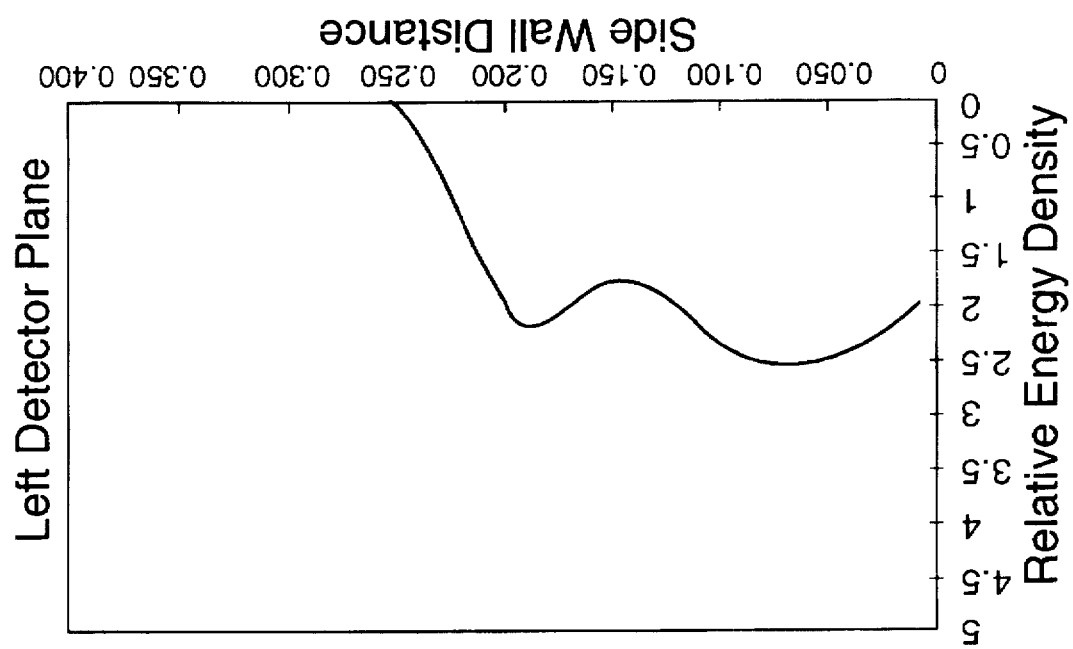

The model simulation showed that a focal position at the surface would direct the beam down into the joint a certain distance before reflecting off a side wall. This distance depended upon joint geometry and beam divergence. Focusing above the surface of the aluminum part coupled more of the beam toward the top of the joint and delivered less energy to the root of the joint. Conversely, moving the focal point lower into the joint resulted in high peak energy deposition at the root of the weld and a more narrow energy distribution band and a higher peak energy lower into the weld joint. This is shown in FIGS. 9A, 9B and 9C. Moving the beam axis offset from the center of the joint was used to model the conditions of misalignment of the beam with the joint as shown in FIGS. 10A, 10B and 10C. Simulation showed that the energy deposited on one side of the joint root compared to the other produced by this beam offset was small, as shown in FIGS. 10A, 10B and 10C. This result indicates that preferential melting of one side wall in addition to joint root melting is possible.

Figure 11A:
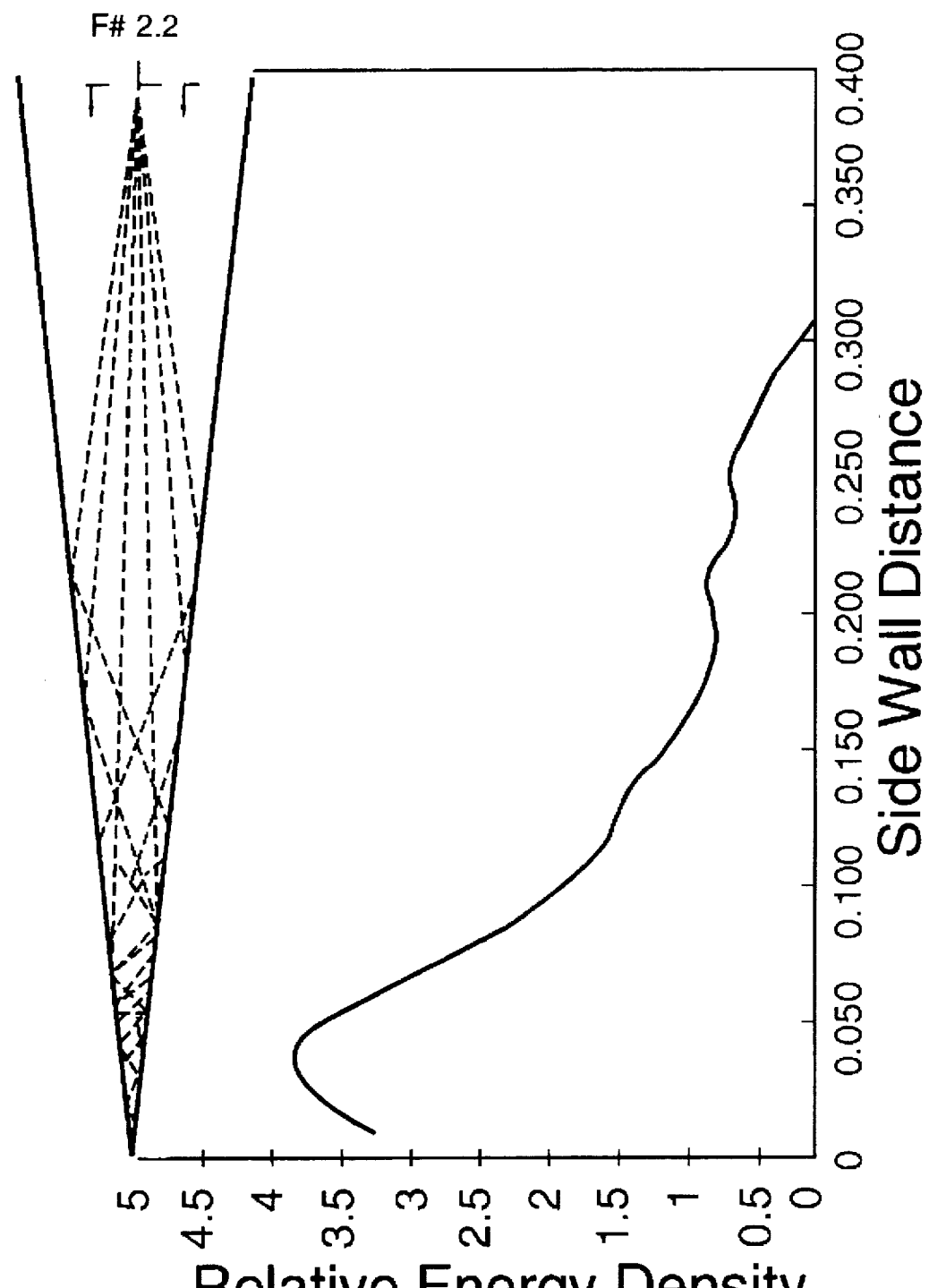
FIG. 11A shows the correlation between the effects of an F/2.2 focused beam and locations of relative energy density in a V-groove weld joint.
Figure 11B:
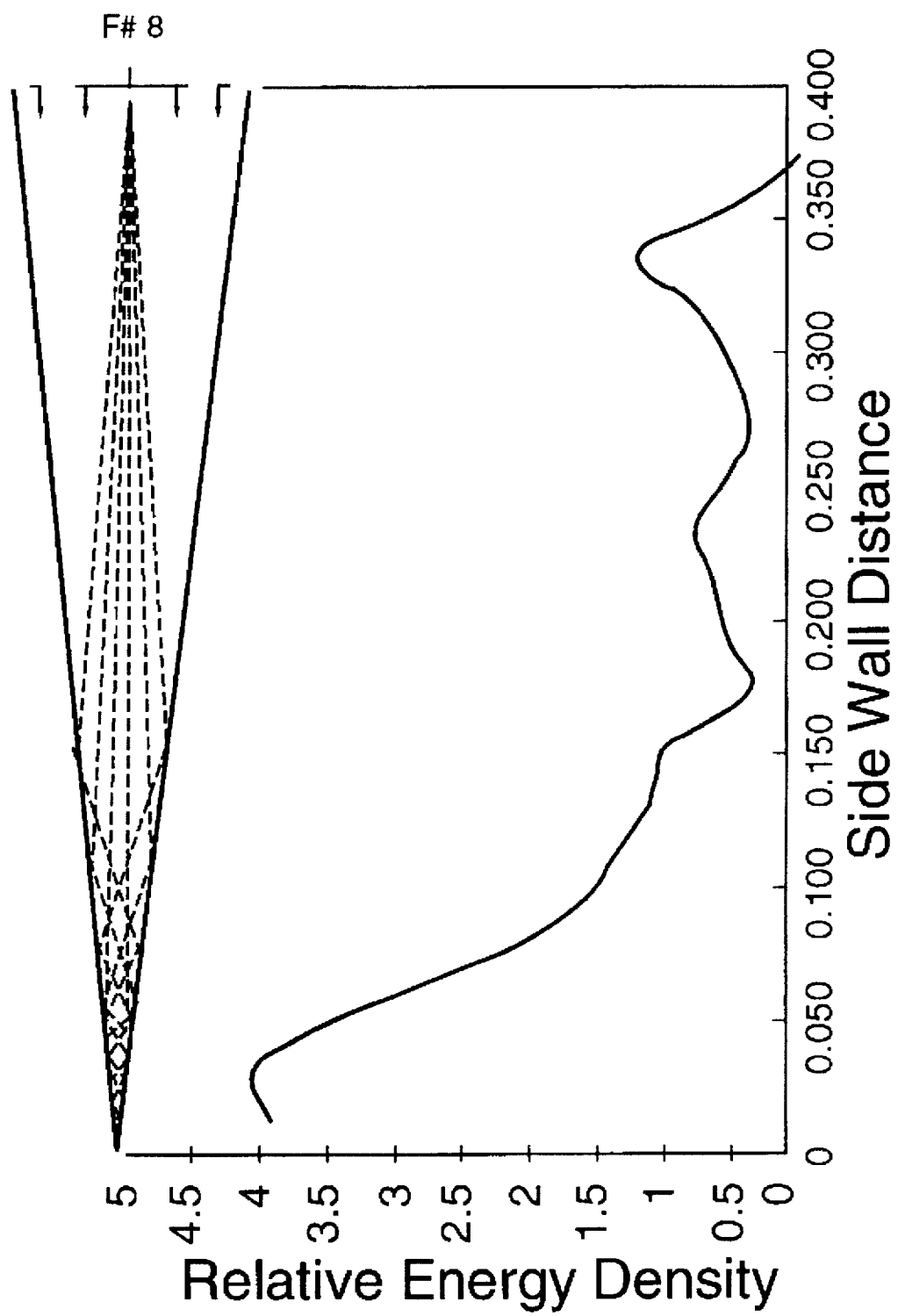
FIG. 11B shows the correlation between the effects of an F/8 focused beam and locations of relative energy density in a V-groove weld joint.

Differences in beam spot diameter were modeled by using a wider distribution of point sources at the focal plane. The conditions of raw beam size and divergence were held constant in the model. The focal length was changed to produce a larger focal spot. This was modeled by distributing the same number of rays (i.e., 5,000) over a larger number of point sources. The results shown in FIGS. 11A and 11B show a higher peak energy, lower into the weld joint, for the conditions modeled.

It was shown that for the joint geometry modeled in aluminum some energy did propagate all the way into the joint root and part of the way back out, as was predicted by the model.

The series of samples of this example were welded using a pulsed Nd:YAG laser welder to direct the laser beam into a narrow gap of 1100 aluminum. Five runs were made using samples with gaps of less than 3 mm.

The laser welding process conditions used for each of the runs is shown in Table 2.

TABLE 2

Weld Processing Conditions Used For a Narrow Gap Weld of Aluminum

| Parameter | Chosen Variable |
| --- | --- |
| Laser | Pulsed Nd:YAG |
| Wavelength | 1.06 μm |
| Average power | 315 watts |
| Pulse length | 8 m/sec |
| Pulse rate | 30 pulses/sec |
| Travel speed | 20.5 cm/min |
| Shield gas | Argon |
| Laser spot size | 0.75 mm |
| Joint type | narrow gap V-joint |
| Joint depth | 1.15 mm |
| Joint opening width | 3.0 mm |
| Joint included angle | 20° |

The beam focal positions used for each of the runs of this example are shown in Table 3.

TABLE 3

Beam Focal Position for 1100 Aluminum Melt Runs

| Run Number | Focal position |
| --- | --- |
| 1 | Sharp focus at surface |
| 2 | 0.05 mm above surface |
| 3 | 0.5 mm below surface |
| 4 | 0.13 mm offset from beam centerline |
| 5* | Sharp focus at surface |

*A bead on plate melt run (no joint)

Figure 12A:
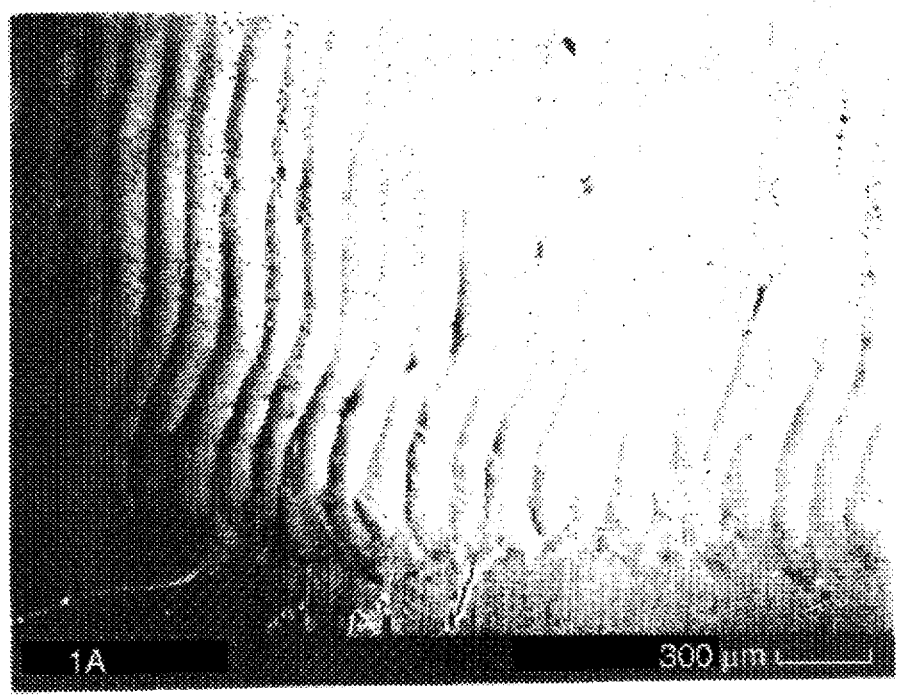
FIG. 12A shows a scanning electron micrographs of sidewall melting patterns resulting from a sharp focus at surface focal position.
Figure 12B:
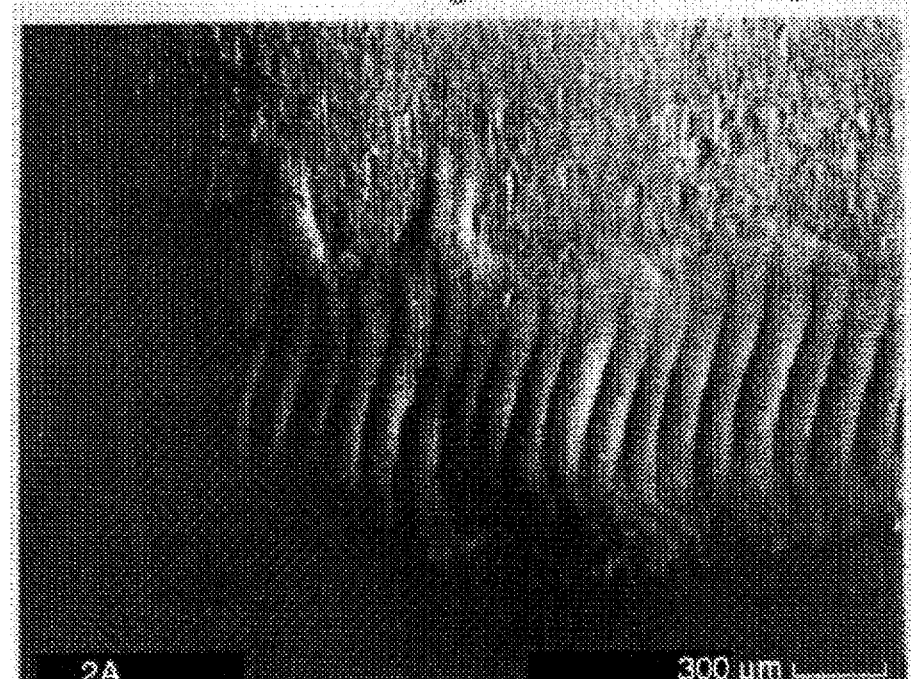
FIG. 12B shows a scanning electron micrographs of sidewall melting patterns resulting from a 0.05 mm above surface focal position.

The thick section 1100 aluminum joint design in each of the runs of this example allowed side wall melting but prevented coalescence and fusion across the root of the weld as a result of the selection of these processing conditions. The side-wall-melting-only condition facilitated opening up the joint after "welding" for inspection of the side wall melt patterns as a function of the changes in focal length shown in FIGS. 12A, 12B, 12C and 12D. FIG. 12A shows the result of focus at the surface; FIG. 12B shows the result of focus 0.5 mm above the surface.

Figure 12C:
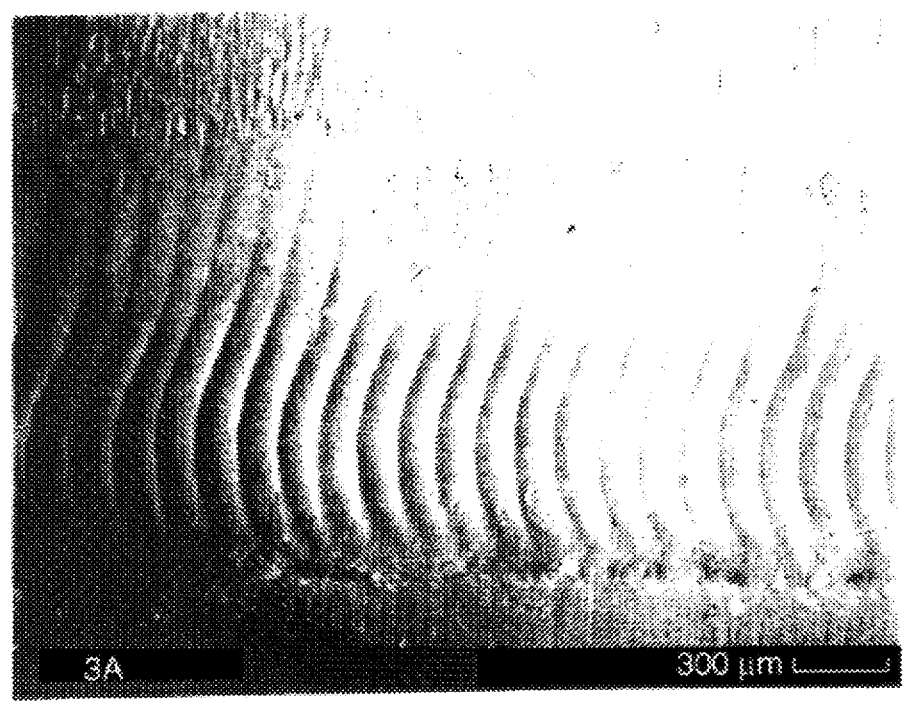
FIG. 12C shows a scanning electron micrographs of sidewall melting patterns resulting from a 0.50 mm below surface focal position.
Figure 12D:
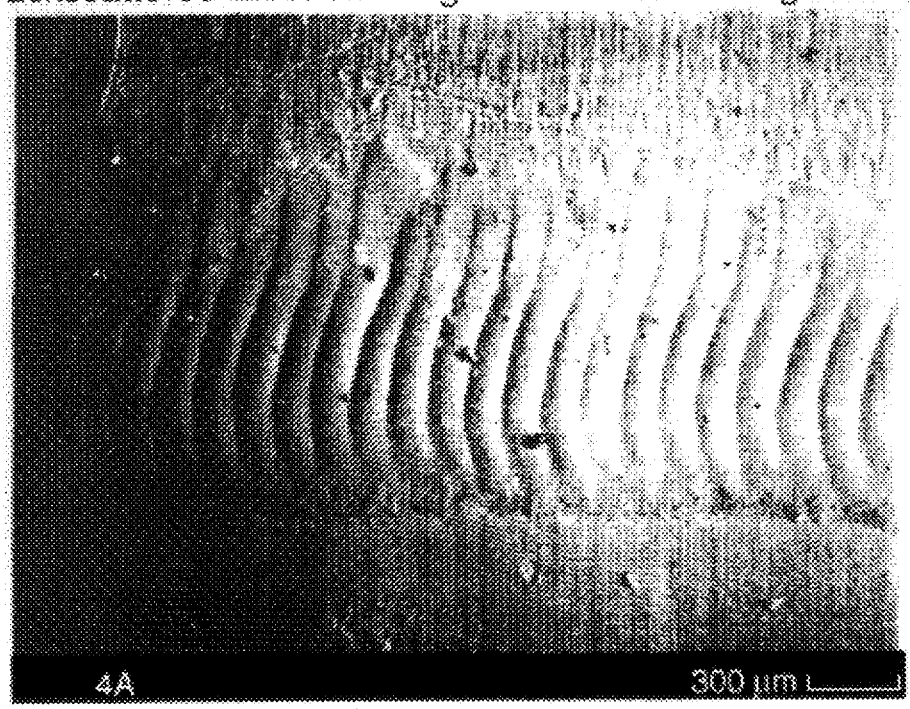
FIG. 12D shows a scanning electron micrographs of sidewall melting patterns resulting from a 0.13 mm offset from beam centerline focal position.

The melted region of shown in FIG. 12C showed indications of a more concentrated melting by a more convex melt surface. The beam was offset from the weld joint axis shown in FIG. 12D and otherwise made using the parameters shown in FIG. 12C. A comparison of melt regions shown in FIGS. 12C and 12D show their surface extent and shape to be substantially identical.

Figure 13:
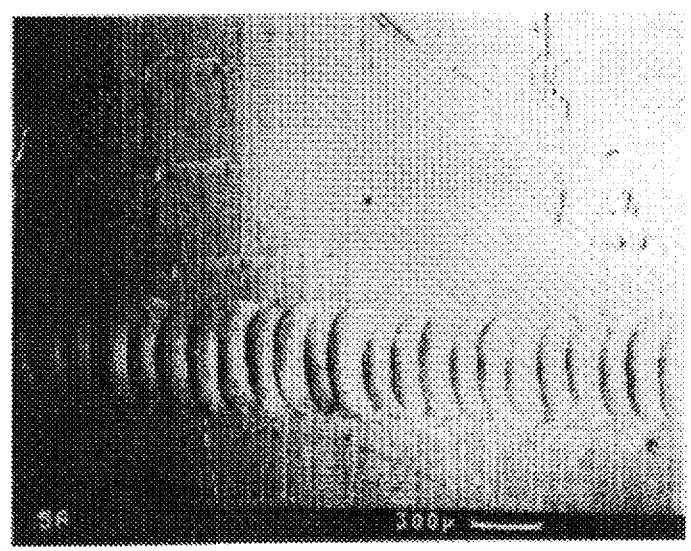
FIG. 13 shows a scanning electron micrograph of a top view of a bead-on-plate laser weld melt run made for comparison purposes.

The same variables were used to produce a melt run (no weld joint) on a flat surface of the same material as shown in FIG. 13 and at the same magnification as that used in FIGS. 12A, 12B, 12C and 12D. The surface area of the melted region on the flat bead on plate weld was observed to be significantly less than the surface area (along the side wall) of the melted regions in the root region of the V-grooves in FIGS. 12A, 12B, 12C, and 12D. These results demonstrate enhanced melting occurring when variables chosen using the optical ray trace models were used for the narrow gap laser beam welding.

Bead-on-plate melt runs were made on 1100 aluminum plate without a weld joint, as shown in FIG. 13 which shows a top view of the weld bead on the plate. These runs were performed at the same processing conditions so that the weld beads on aluminum plate could be compared with the V-groove melt runs.

Using the condition where the beam was focused at the top surface level above the joint gap as a baseline, the melt zones produced by focusing above the surface were observed to have a slightly smaller melted region below the surface exhibited a more shallow melted region.

EXAMPLE III

Another sample run was made under the same conditions, using the materials and equipment described as follows:

Material 1100 Al

Laser Lumonics Multi-Wave 2000

Laser Type 2 kW, CW, Nd:YAG

Laser Power 2 kW

Conditions of the weld were:

Focus Point surface above joint

Focus Location center of joint

Spot Size 0.75 mm

Joint Depth 3 mm

Joint Angle 20° included

F#F5

The ray tracing model used and generated the following values:

Reflectance R=0.75

Welding Speed 50 ipm

Surface Coupling 25%

Joint Coupling 81%

Figure 14A:
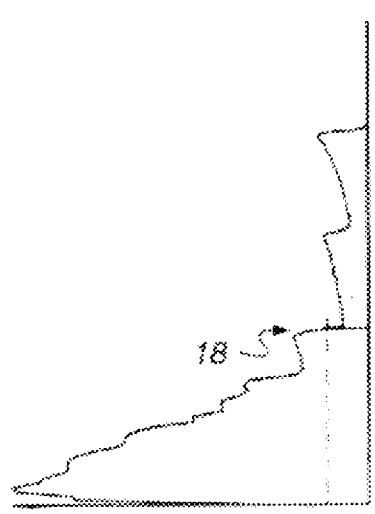
FIGS. 14A, 14B and 14C show a comparison between an optical ray trace simulation and an actual laser weld in aluminum.
Figure 14B:
Figure 14C:
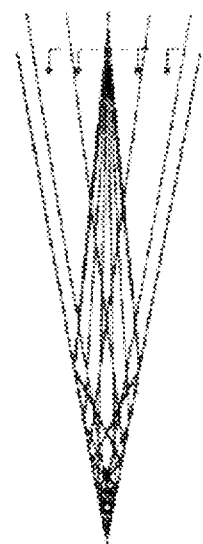

FIG. 14A shows a graph of the relative intensity with the melting threshold 18. FIG. 14B shows a transverse section of the laser weld actually made. FIG. 14C shows the ray tracing model of the laser weld.

The location of the energy peak in the plot from the computer simulation was in the same location as the melting in the joint and the weld. As shown in simulations, given an absorption co-efficient of 25%, a beam incident on a flat surface would only exhibit an absorption of 25%. The model showed a total absorption of the incident rays of 81% under the conditions and 25% absorption coefficient of the model used in this example and of the welds made for this example. A change in the absorption coefficient from 0.25 to 0.1 was made to model the total absorption of a $CO_2$ laser. This showed less (56%) total energy coupled due to energy being lost by reflection back out of the joint for the same beam and joint conditions.

The results of this run, shown in FIGS. 14A, 14B and 14C, demonstrated that there was good agreement between the energy peak predicted by the model for the aluminum weld joint and the actual weld made under the same conditions as the model.

EXAMPLE IV

Other laser weld conditions were modeled to determine the results of using those conditions.

Figure 15A:
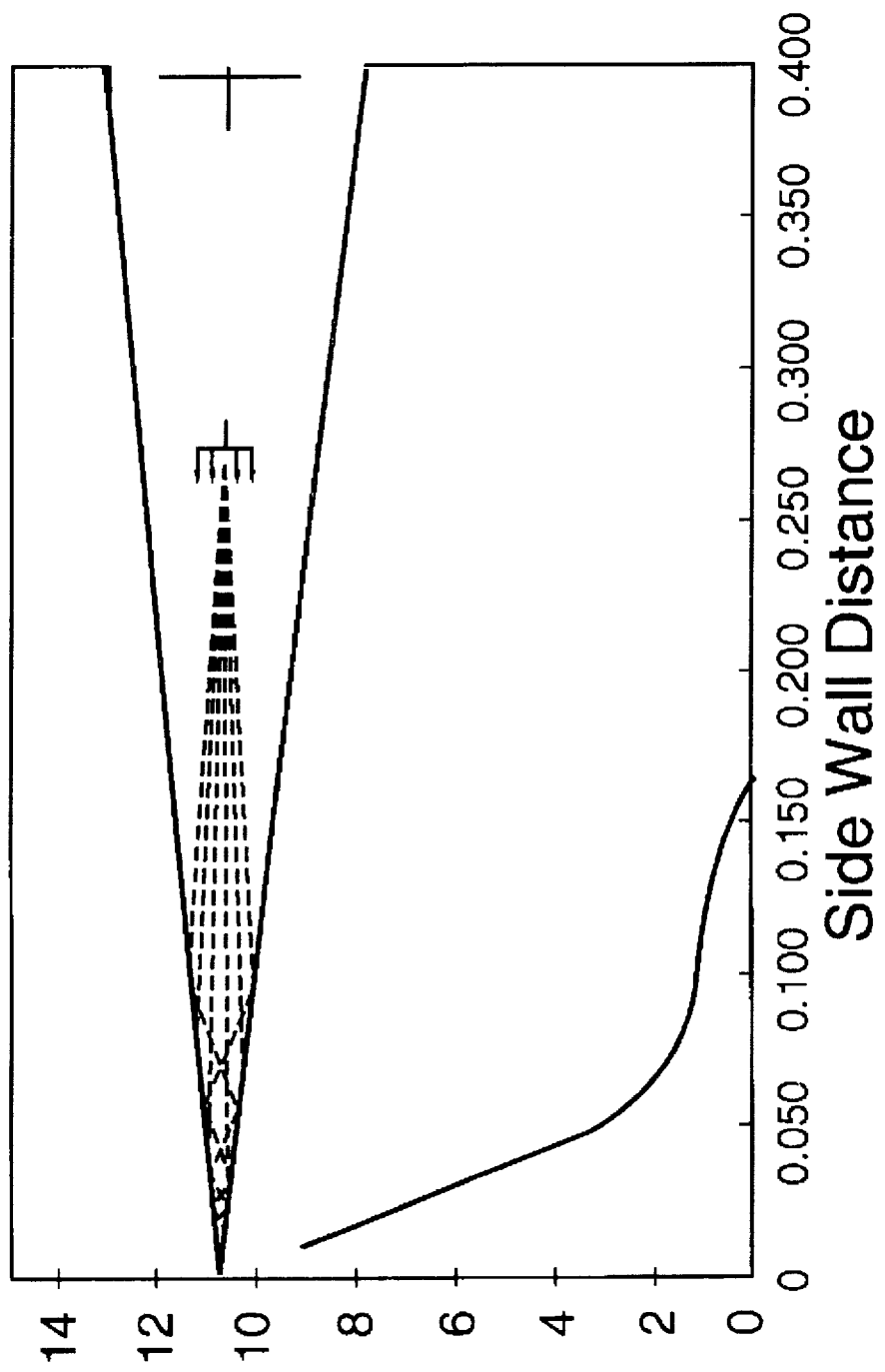
FIGS. 15A, 15B and 15C show a comparison between simulations in which focal point location and joint angle are changed.
Figure 15B:
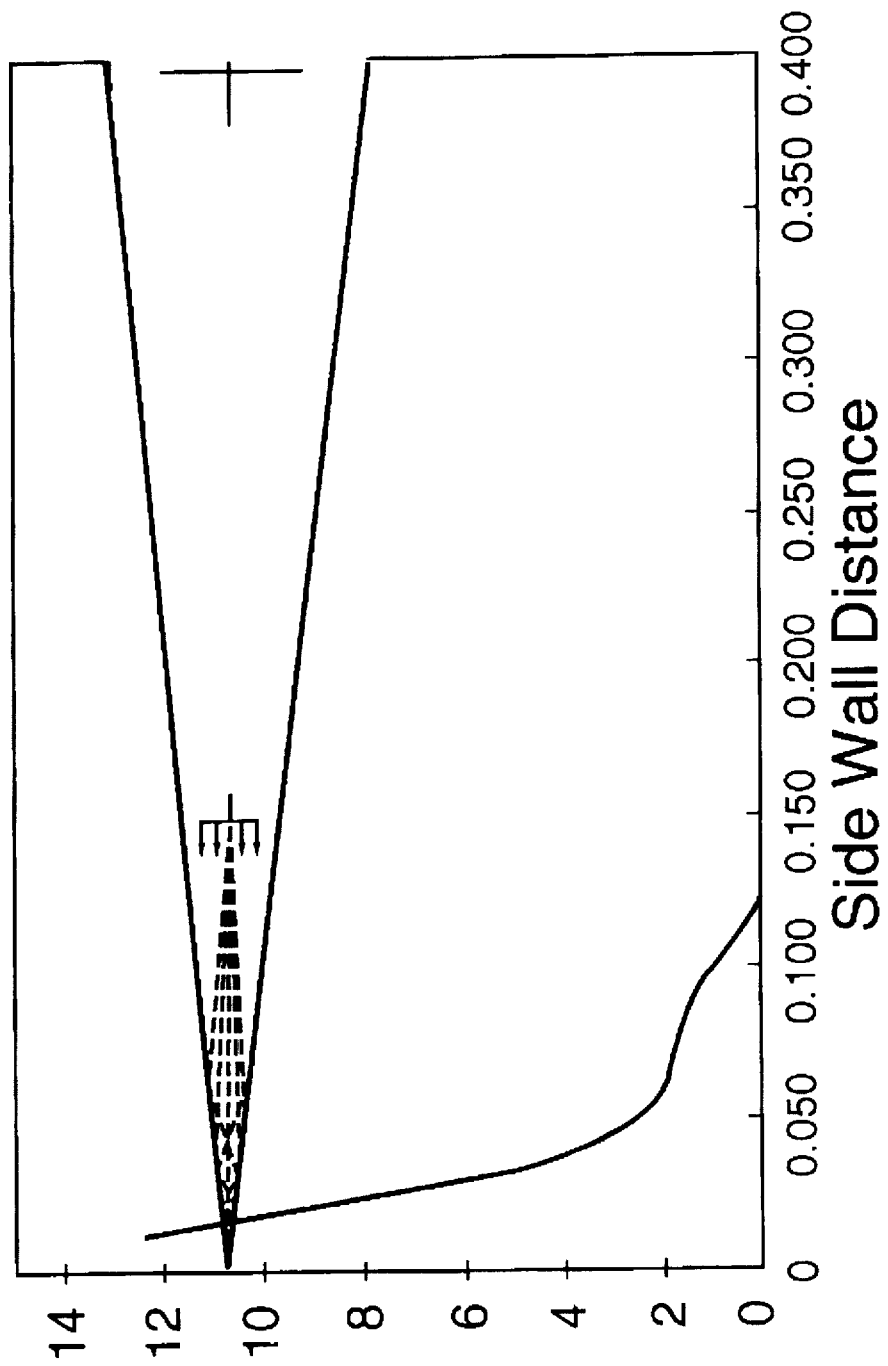
Figure 15C:
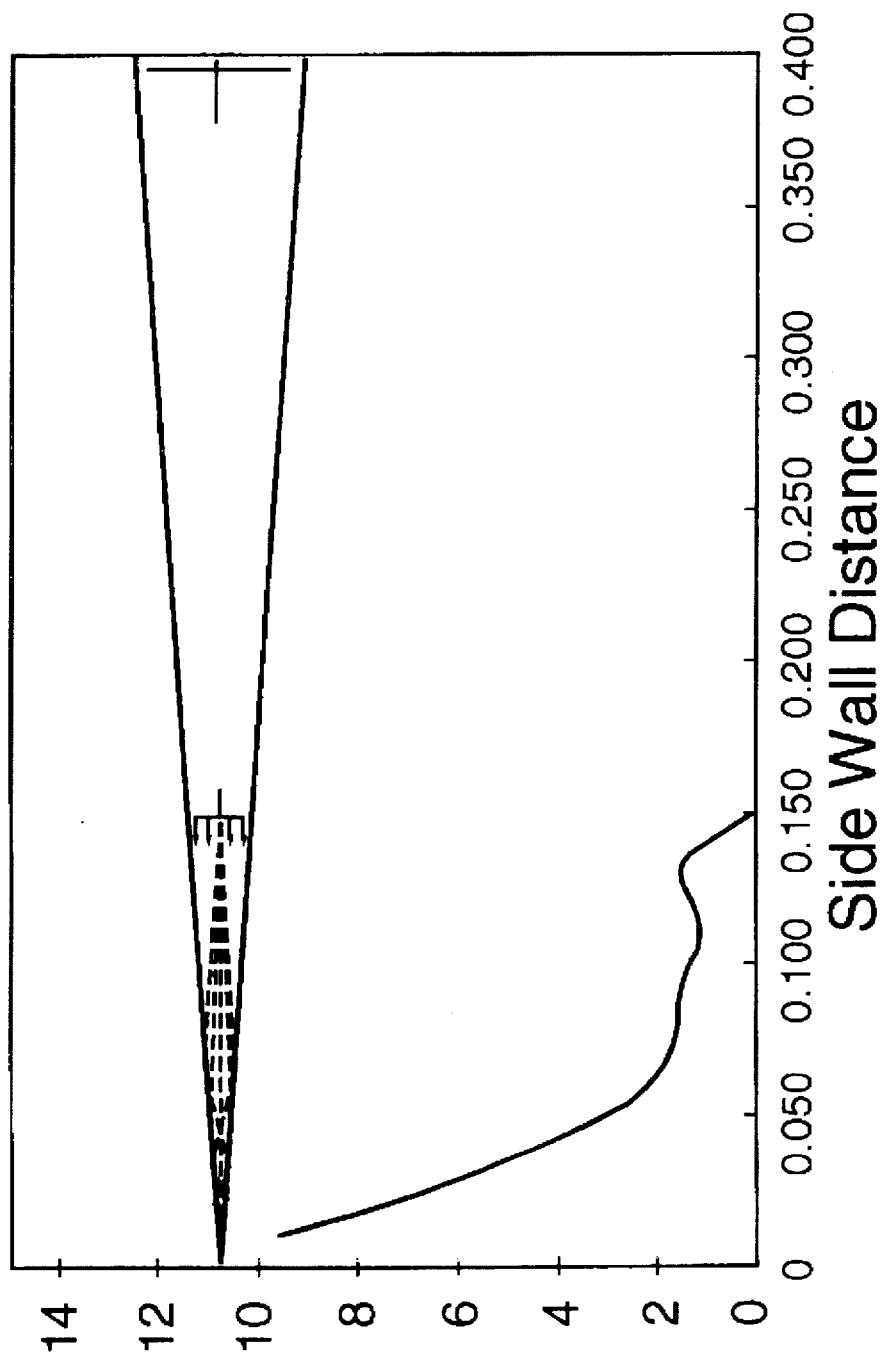

When modeling a different wavelength such as that for $CO_2$ welding, the coupling coefficient could be changed as was done to accommodate changes in material reflectivity. A higher quality beam, (i.e., one with less divergence for a similar or smaller spot size for the same F-number) was modeled. The higher quality beam showed a significant advantage to transporting energy deep within a narrow gap. A comparison between simulations using an improvement in beam quality and changes to focus depth and joint angle is shown in FIG. 15A and 15B. This multi-parameter optimization improved peak energy in the joint through focal point changes. FIG. 15A shows a model using F/8, spot size of approximately 0.008", focus depth of 0.125" below the surface, and a joint half angle of approximately 6°. FIG. 15B shows a model using F/8, spot size of approximately 0.008", focus depth of 0.250", and a joint half angle of approximately 6°. FIG. 15C shows a model using F/8, spot size of approximately 0.008", focus depth of 0.250", and a smaller joint half angle of approximately 4°.

However, when the joint angle was reduced to 4 degrees, the expected further improvement in peak energy such as that shown in FIG. 15C was not seen. More energy made its way all the way into the joint and was deposited on the way back out before rays left the joint. This resulted in a decreased relative energy peak.

The foregoing examples show that simulation runs using the ray tracing model allows quantitative comparison of the effect of various weld parameter value changes. Qualitative comparisons with actual welds compared well even though the model did not include heat flow and fluid flow values.

Use of a coupling coefficient which increases with an increase of incident angle would tend to further increase energy deposition into the lower root portion of the joint.

The simple geometric ray trace model was in good agreement with the experimentation for the predicted location of energy deposition and the areas of weld joint side wall which reached energy density thresholds sufficient to attain melting. The model was in good agreement with experiments to identify the most dominant effects of parameters, i.e., strong angle dependency, weaker focal position dependency weaker lateral location dependency.

The two-dimensional simulation of the beam propagation in the plane normal to the direction of travel is significant in that it described the location of greatest effect for beam reflective propagation back up out of the weld joint and impinging back onto the equipment. Back reflection of the beam off of the part and back into the delivery optics can be significant enough to damage high powered laser welding equipment, particularly when welding highly reflective materials. Simulation showed that back reflection could be reduced by almost an order of magnitude with the proper choice of joint angle.

The model has shown itself useful as a prescription for design of very narrow joints and the selection of important welding parameters. It has been shown that energy distribution as a function of depth can be affected by changes to laser and joint parameters. The effect of energy peak location, width and height as a function of joint geometry and material reflectivity show there is no single solution, i.e., no rule of thumb for joint designs.

The models showed that the process is more tolerant to changes in lead or lag tilt of the beam axis relative to the weld joint and beam offset than it is to changes in joint angle or side tilt of the beam axis. Any change that increases the angle of the beam with respect to the weld joint tends to walk the beam out of the joint faster and is less likely to deposit energy deep into the weld joint. Utilization of high divergence beams could be used to melt side walls while accommodating gaps in the weld root region.

Focal point location changes are an effective way to change energy distribution within the joint, particularly when using multiple passes. Novel joint designs may enhance the reliability of shrinkage and side wall melting to fully accommodate joint fill requirements. Existing methods used to fill the resultant joint under fill such as wire or powder may be employed. Post-weld machining off of the undercut top bead may also be performed. The method may also provide a way to utilize more economical and compact fiber optically delivered lasers to achieve the additional goal of system flexibility.

While the apparatuses, articles of manufacture, methods and compositions of this invention have been described in detail for the purpose of illustration, the inventive apparatuses, articles of manufacture, methods and compositions are not to be construed as limited thereby. This patent is intended to cover all changes and modifications within the spirit and scope thereof.

INDUSTRIAL APPLICABILITY

The narrow gap laser welding process of this invention can be useful for any applications for which it is desired to economically join pieces of metal, join out-of-position pieces of metal, join pieces of metal using lower power laser equipment, join pieces of metal where a good quality high depth-to-width aspect ratio weld is desired, or join highly reflective pieces of metal.

What is claimed is:

1. A laser welding process comprising: (a) using optical ray tracing to make a model of a laser beam and the geometry of a joint to be welded; (b) adjusting at least one variable in said model to choose variables for use in making a laser weld; and (c) laser welding said joint to be welded using variables chosen in step (b).

2. A laser welding process as recited in claim 1 wherein said welding joint has a gap of less than 3 mm.

3. A laser welding process as recited in claim 2 wherein said welding joint has a gap of less than 2 mm.

4. A laser welding process as recited in claim 1 wherein said process is a conduction mode melting process.

5. A laser welding process as recited in claim 1 wherein there are multiple reflections of said laser beam in said joint to be welded.

6. A laser welding process as recited in claim 1 wherein said joint to be welded is comprised of a metal chosen from the group of stainless steel, aluminum, beryllium and alloys thereof.

7. A laser welding process as recited in claim 1 wherein said joint to be welded is comprised of metal chosen from the group of niobium, tantalum, rhenium and alloys thereof.

8. A laser welding process as recited in claim 1 wherein said at least one variable are chosen from the group of laser F-number, laser beam divergence, laser beam quality, laser focal position, tilt of laser beam axis, spatial laser energy distribution, laser wavelength, reflectivity of surfaces to be welded, joint angle of surfaces to be welded, shapes of joint of surfaces to be welded, surface condition, and number of weld passes to be made.

* * * * *